(12) United States Patent
Shimomura

(10) Patent No.: US 11,956,820 B2
(45) Date of Patent: Apr. 9, 2024

(54) TRANSMISSION DEVICE, RECEPTION DEVICE, WIRELESS COMMUNICATION SYSTEM, AND COMMUNICATION METHOD

(71) Applicant: FUJITSU LIMITED, Kawasaki (JP)

(72) Inventor: Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 556 days.

(21) Appl. No.: 17/167,798

(22) Filed: Feb. 4, 2021

(65) Prior Publication Data

US 2021/0160925 A1    May 27, 2021

Related U.S. Application Data

(63) Continuation of application No. PCT/JP2018/029689, filed on Aug. 7, 2018.

(51) Int. Cl.
| | |
|---|---|
| *H04W 16/14* | (2009.01) |
| *H04L 1/1812* | (2023.01) |
| *H04W 72/0446* | (2023.01) |
| *H04W 72/23* | (2023.01) |
| *H04W 74/00* | (2009.01) |
| *H04W 74/0816* | (2024.01) |

(52) U.S. Cl.
CPC ....... *H04W 74/0816* (2013.01); *H04L 1/1819* (2013.01); *H04W 16/14* (2013.01); *H04W 72/0446* (2013.01); *H04W 72/23* (2023.01); *H04W 74/008* (2013.01)

(58) Field of Classification Search
CPC . H04W 72/23; H04W 16/16; H04W 72/0446; H04L 12/28
USPC ......................................... 370/329, 400, 403
See application file for complete search history.

(56) References Cited

U.S. PATENT DOCUMENTS

| | | | |
|---|---|---|---|
| 9,775,048 B2 * | 9/2017 | Reddy | H04W 16/14 |
| 2016/0007324 A1 | 1/2016 | Lee et al. | |
| 2017/0339704 A1 | 11/2017 | Matsumoto et al. | |

FOREIGN PATENT DOCUMENTS

CN    105052068 A    11/2015

OTHER PUBLICATIONS

Huawei et al., "NR frame structure on unlicensed bands", Agenda Item: 6.8, 3GPP TSG-RAN WG1 Meeting NR#3, R1-1715580, Nagoya, Japan, Sep. 18-21, 2017.

(Continued)

*Primary Examiner* — Dang T Ton
(74) *Attorney, Agent, or Firm* — Myers Wolin, LLC

(57) ABSTRACT

A transmission device, which is capable of wirelessly communicating with a reception device by using a first frequency band that does not need a license, the transmission device including, a controller configured to verify whether the first frequency band is not used by other transmission devices, and shift, in a time direction, a first symbol including a first control channel and a first shared channel in a first communication direction, or a second symbol including a second shared channel in a second communication direction different from the first communication direction, and a transmitter configured to transmit, to the reception device, a first control signal and first data, which are allocated to the first symbol, by using the first control channel and the first shared channel, respectively, or second data allocated to the second symbol by using the second shared channel.

6 Claims, 27 Drawing Sheets

(56) References Cited

OTHER PUBLICATIONS

Extended European search report with supplementary European search report and the European search opinion Issued by the European Patent Office for corresponding European Patent Application No. 18929086.9-1215, dated Jul. 23, 2021.
Communication pursuant to Article 94(3) EPC issued by the European Patent Office for corresponding European Patent Application No. 18 929 086.9-1215, dated Mar. 27, 2023.
Examination Report issued by the Patent Office of India for corresponding Indian Patent Application No. 202137005872, dated Jan. 21, 2022, with an English translation.
3GPP TS 36.211 V15.1.0, "3rd Generation Partnership Project; Technical Specification Group Radio Access Network; Evolved Universal Terrestrial Radio Access (E-UTRA); Physical channels and modulation (Release 15)", Mar. 2018.
3GPP TS 36.212 V15.1.0, "3rd Generation Partnership Project; Technical Specification Group Radio Access Network; Evolved Universal Terrestrial Radio Access (E-UTRA); Multiplexing and channel coding (Release 15)", Mar. 2018.
3GPP TS 36.213 V15.1.0, "3rd Generation Partnership Project; Technical Specification Group Radio Access Network; Evolved Universal Terrestrial Radio Access (E-UTRA); Physical layer procedures (Release 15)", Mar. 2018.
3GPP TS 36.300 V15.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Mar. 2018.
3GPP TS 36.321 V15.1.0, "3rd Generation Partnership Project; Technical Specification Group Radio Access Network; Evolved Universal Terrestrial Radio Access (E-UTRA); Medium Access Control (MAC) protocol specification (Release 15)", Mar. 2018.
3GPP TS 36.322 V15.0.1, "3rd Generation Partnership Project; Technical Specification Group Radio Access Network; Evolved Universal Terrestrial Radio Access (E-UTRA); Radio Link Control (RLC) protocol specification (Release 15)", Apr. 2018.
3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.
3GPP TS 36.331 V15.1.0, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018.
3GPP TS 36.413 V15.1.0, "3rd Generation Partnership Project; Technical Specification Group Radio Access Network; Evolved Universal Terrestrial Radio Access Network (E-UTRAN); S1 Application Protocol (S1AP) (Release 15)", Mar. 2018.
3GPP TS 36.423 V15.1.0, "3rd Generation Partnership Project; Technical Specification Group Radio Access Network; Evolved Universal Terrestrial Radio Access Network (E-UTRAN); X2 application protocol (X2AP) (Release 15)", Mar. 2018.
3GPP TS 36.425 V14.1.0, "3rd Generation Partnership Project; Technical Specification Group Radio Access Network; Evolved Universal Terrestrial Radio Access Network (E-Utran); X2 interface user plane protocol (Release 14)", Mar. 2018.
3GPP TS 37.340 V15.1.0, "3rd Generation Partnership Project; Technical Specification Group Radio Access Network; Evolved Universal Terrestrial Radio Access (E-UTRA) and NR; Multi-connectivity; Stage 2 (Release 15)", Mar. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.1.0, "3rd Generation Partnership Project; Technical Specification Group Radio Access Network; NR; Services provided by the physical layer (Release 15)", Mar. 2018.
3GPP TS 38.211 V15.1.0, "3rd Generation Partnership Project; Technical Specification Group Radio Access Network; NR; Physical channels and modulation (Release 15)", Mar. 2018.
3GPP TS 38.212 V15.1.1, "3rd Generation Partnership Project; Technical Specification Group Radio Access Network; NR; Multiplexing and channel coding (Release 15)", Apr. 2018.
3GPP TS 38.213 V15.1.0, "3rd Generation Partnership Project; Technical Specification Group Radio Access Network; NR; Physical layer procedures for control (Release 15)", Mar. 2018.
3GPP TS 38.214 V15.1.0, "3rd Generation Partnership Project; Technical Specification Group Radio Access Network; NR; Physical layer procedures for data (Release 15)", Mar. 2018.
3GPP TS 38.215 V15.1.0, "3rd Generation Partnership Project; Technical Specification Group Radio Access Network; NR; Physical layer measurements (Release 15)", Mar. 2018.
3GPP TS 38.300 V15.1.0, "3rd Generation Partnership Project; Technical Specification Group Radio Access Network; NR; NR and NG-RAN Overall Description; Stage 2 (Release 15)", Mar. 2018.
3GPP TS 38.321 V15.1.0, "3rd Generation Partnership Project; Technical Specification Group Radio Access Network; NR; Medium Access Control (MAC) protocol specification (Release 15)", Mar. 2018.
3GPP TS 38.322 V15.1.0, "3rd Generation Partnership Project; Technical Specification Group Radio Access Network; NR; Radio Link Control (RLC) protocol specification (Release 15)", Mar. 2018.
3GPP TS 38.323 V15.1.0, "3rd Generation Partnership Project; Technical Specification Group Radio Access Network; NR; Packet Data Convergence Protocol (PDCP) specification (Release 15)", Mar. 2018.
3GPP TS 38.331 V15.1.0, "3rd Generation Partnership Project; Technical Specification Group Radio Access Network; NR; Radio Resource Control (RRC) protocol specification (Release 15)", Mar. 2018.
3GPP TS 38.401 V15.1.0, "3rd Generation Partnership Project; Technical Specification Group Radio Access Network; NG-RAN; Architecture description (Release 15)", Mar. 2018.
3GPP TS 38.410 V0.9.0, "3rd Generation Partnership Project; Technical Specification Group Radio Access Network; NG-RAN; NG general aspect and principles (Release 15)", Apr. 2018, with cover sheet, clean version, and marked up version.
3GPP TS 38.413 V0.8.0, "3rd Generation Partnership Project; Technical Specification Group Radio Access Network; NG-RAN; NG Application Protocol (NGAP) (Release 15)", Apr. 2018, with cover sheet, clean version, marked up version, and list of open issues.
3GPP TS 38.420 V0.8.0, "3rd Generation Partnership Project; Technical Specification Group Radio Access Network; NG-RAN; Zn general aspects and principles (Release 15)", Apr. 2018, with cover sheet, clean version, and marked up version.
3GPP TS 38.423 V0.8.0, "3rd Generation Partnership Project; Technical Specification Group Radio Access Network; NG-RAN; Xn application protocol (XnAP) (Release 15)", Apr. 2018, with cover sheet, clean version, and marked up version.
3GPP TS 38.470 V15.1.0, "3rd Generation Partnership Project; Technical Specification Group Radio Access Network; NG-RAN; F1 general aspects and principles (Release 15)", Mar. 2018.
3GPP TS 38.473 V15.1.1, "3rd Generation Partnership Project; Technical Specification Group Radio Access Network; NG-RAN; F1 application protocol (F1AP) (Release 15)", Apr. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

(56) References Cited

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V14.3.1, "3rd Generation Partnership Project; Technical Specification Group Radio Access Network; Study on channel model for frequency spectrum above 6 GHZ (Release 14)", Jul. 2017.

3GPP TR 38.912 V14.1.0, "3rd Generation Partnership Project; Technical Specification Group Radio Access Network; Study on New Radio (NR) access technology (Release 14)", Jun. 2017.

3GPP TR 38.913 V14.3.0, "3rd Generation Partnership Project; Technical Specification Group Radio Access Network; Study on Scenarios and Requirements for Next Generation Access Technologies; (Release 14)", Jun. 2017.

Nokia et al., "Enriched feedback for adaptive HARQ", Agenda Item: 5.1.3.3, 3GPP TSG-RAN WG1 Meeting #NR, R1-1701020, Spokane, USA, Jan. 16-20, 2017.

Nokia et al., "On the UL control channel structure for NR", Agenda Item: 8.1.7.1, 3GPP TSG-RAN WG1 Meeting #86Bis, R1-1609740, Lisbon, Portugal, Oct. 10-14, 2016.

International Search Report issued by the Japan Patent Office for corresponding International Patent Application No. PCT/JP2018/029689, dated Oct. 30, 2018.

Written Opinion of the International Searching Authority issued by the Japan Patent Office for corresponding International Patent Application No. PCT/JP2018/029689, dated Oct. 30, 2018, with an English translation.

First Notification of Office Action and Search Report issued by the China National Intellectual Property Administration for corresponding Chinese Patent Application No. 201880096430.4, dated May 24, 2023, with an English translation.

Notice of Reasons for Refusal issued by the Japan Patent Office for corresponding Japanese Patent Application No. 2020-535382, dated Mar. 15, 2022, with a full English translation.

Notice of Preliminary Rejection issued by the Korean Intellectual Property Office for corresponding Korean Patent Application No. 10-2021-7006669, dated Sep. 20, 2023, with an English translation.

ETRI, "Remaining details of multi-subframe scheduling for eLAA", Agenda item: 6.2.1.1, 3GPP TSG RAN WG1 Meeting #85, R1-165247, Nanjing, China, May 23-27, 2016.

Ericsson et al., "On Multi-Subframe and Cross-Subframe Scheduling", Agenda Item: 6.2.5.1.1, 3GPP TSG RAN WG1 Meeting #73, R1-132145, Fukuoka, Japan, May 20-24, 2013.

* cited by examiner

WIRELESS COMMUNICATION SYSTEM 10

FIG. 5A

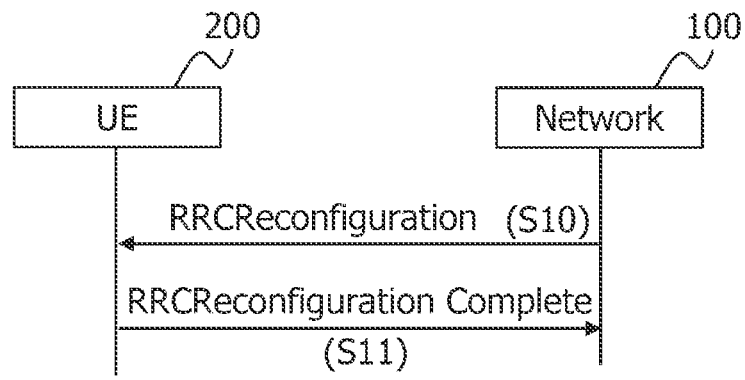

FIG. 5B

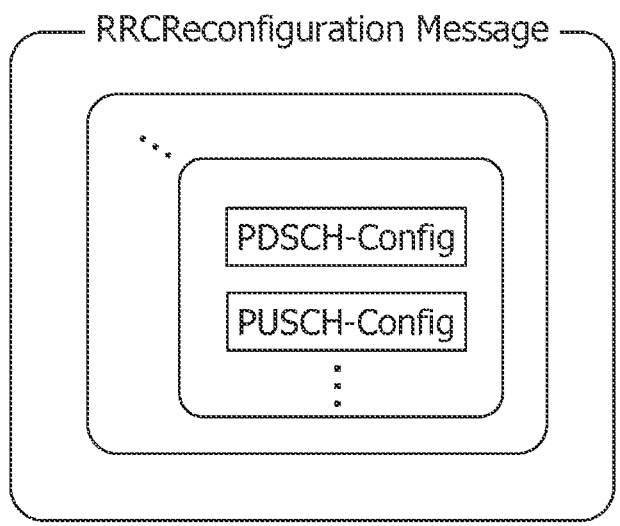

FIG. 6

PDSCH-Config (PUSCH-Config)

(1) WHETHER Cross TTI IS TO BE EXECUTED (2) SLOT NUMBER OF SLOT IN WHICH UNTRANSMITTED PART IS TO BE TRANSMITTED (3) SYMBOL NUMBER OF SYMBOL AT WHICH TRANSMISSION IS TO BE STARTED A ONE SYMBOL IS INSUFFICIENT → FOURTEENTH SYMBOL
B TWO SYMBOLS ARE INSUFFICIENT → THIRTEENTH SYMBOL
C THREE SYMBOLS ARE INSUFFICIENT → TWELFTH SYMBOL
...
M THIRTEEN SYMBOLS ARE INSUFFICIENT → SECOND SYMBOL (4) WHETHER END SYMBOL OF NEXT SLOT OF HEAD SLOT IS TO BE SHIFTED TO SLOT SUBSEQUENT TO NEXT SLOT

FIG. 9

| REGION NAME | METHOD OF USING Rel-15 NR | USE METHOD IN THIS EMBODIMENT EXAMPLE |
|---|---|---|
| Time domain resource Assignment (TDRA) | SPECIFICATION OF RESOURCES IN TIME DIRECTION (SPECIFICATION THAT EXCEEDS Slot IS ERROR) | THERE IS NO CHANGE IN DETAILS IN CASE OF SHIFTING FOR PDCCH#m |
| New data indicator (NDI) | EXECUTE Toggle WHEN TB WITH DETAILS DIFFERENT FROM PREVIOUS DETAILS IS TRANSMITTED (Toggle IS NOT EXECUTED IN CASE OF RETRANSMISSION) | INDICATE SAME TB BY NOT EXECUTING Toggle FOR PDCCH#m AND PDCCH#n. INDICATE TRANSMISSION OF UNTRANSMITTED PART OF SAME TB BY SYNCHRONIZING WITH DETAILS OF TDRA |
| HARQ process number | IDENTIFICATION NUMBER OF BUFFER FOR EACH TB | SAME AS LEFT |
| Redundancy version (RV) | VERSION OF CODED DATA (IMPROVE CODING GAIN BY CHANGING VERSION FOR EACH RETRANSMISSION) | SET SAME VALUE FOR PDCCH#m AND PDCCH#n (NOT CHANGED) |
| Modulation and coding Scheme (MCS) | CODE RATE AND MODULATION METHOD | SAME AS LEFT |
| Frequency domain resource assignment (FDRA) | SPECIFICATION OF RESOURCES IN FREQUENCY DIRECTION | SAME AS LEFT |
| ... | ... | ... |

FIG. 10A

[PDCCH#m]

| REGION NAME | DETAILS |
|---|---|
| TDRA | S=0, L=14 |
| NDI | 0 |
| HARQ PROCESS NUMBER | 5 |
| RV | ** |
| ... | ... |

FIG. 10B

TB IS SAME AS TB SPECIFIED IN PDCCH#m, AND RV IS ALSO SAME, WHICH INDICATES TRANSMISSION OF UNTRANSMITTED PORTION

[PDCCH#n]

| REGION NAME | DETAILS |
|---|---|
| TDRA | S=4, L=4 |
| NDI | 0 |
| HARQ PROCESS NUMBER | 5 |
| RV | ** |
| ... | ... |

FIG. 10C

[PDCCH#m1]

| REGION NAME | DETAILS |
|---|---|
| TDRA | S=0, L=14 |
| NDI | 0 |
| HARQ PROCESS NUMBER | 6 |
| RV | ** |
| ... | ... |

FIG. 13

PDSCH-Config (OR PUSCH-Config)

(1) WHETHER Cross TTI IS TO BE EXECUTED (2) SLOT NUMBER OF SLOT IN WHICH UNTRANSMITTED PART IS TO BE TRANSMITTED (3) SYMBOL NUMBER OF SYMBOL AT WHICH TRANSMISSION IS TO BE STARTED A ONE SYMBOL IS INSUFFICIENT → FOURTEENTH SYMBOL
  B TWO SYMBOLS ARE INSUFFICIENT → THIRTEENTH SYMBOL
  C THREE SYMBOLS ARE INSUFFICIENT → TWELFTH SYMBOL
        ...
  M THIRTEEN SYMBOLS ARE INSUFFICIENT → SECOND SYMBOL (4) WHETHER END SYMBOL OF NEXT SLOT OF HEAD SLOT IS TO BE SHIFTED TO SLOT SUBSEQUENT TO NEXT SLOT (5) Ending Symbol (E))
  (FOR INSTANCE, E = 6 WHEN S < 6, OR E = 13 OTHERWISE)

FIG. 14

| REGION NAME | METHOD OF USING Rel-15 NR | USE METHOD IN THIS EMBODIMENT EXAMPLE |
|---|---|---|
| Time domain resource Assignment (TDRA) | SPECIFICATION OF RESOURCES IN TIME DIRECTION (SPECIFICATION THAT EXCEEDS Slot IS ERROR) | THERE IS NO CHANGE IN DETAILS IN CASE OF SHIFTING FOR PDCCH#m |
| New data indicator (NDI) | EXECUTE Toggle WHEN TB WITH DETAILS DIFFERENT FROM PREVIOUS DETAILS IS TRANSMITTED (Toggle IS NOT EXECUTED IN CASE OF RETRANSMISSION) | INDICATE SAME TB BY NOT EXECUTING Toggle FOR PDCCH#m AND PDCCH#n. INDICATE TRANSMISSION OF UNTRANSMITTED PART OF SAME TB BY SYNCHRONIZING WITH DETAILS OF TDRA |
| HARQ process number | IDENTIFICATION NUMBER OF BUFFER FOR EACH TB | SAME AS LEFT |
| Redundancy version (RV) | VERSION OF CODED DATA (IMPROVE CODING GAIN BY CHANGING VERSION FOR EACH RETRANSMISSION) | SET SAME VALUE FOR PDCCH#m AND PDCCH#n (NOT CHANGED) |
| Modulation and coding Scheme (MCS) | CODE RATE AND MODULATION METHOD | SAME AS LEFT |
| Frequency domain resource assignment | SPECIFICATION OF RESOURCES IN FREQUENCY DIRECTION | SAME AS LEFT |
| Ending Symbol (E) | (NONE) | WHEN E IS USED, $L = E - S + 1$ CAN BE CALCULATED, AND THUS THERE IS NO NEED FOR NOTIFYING OF L |
| ... | | ... |

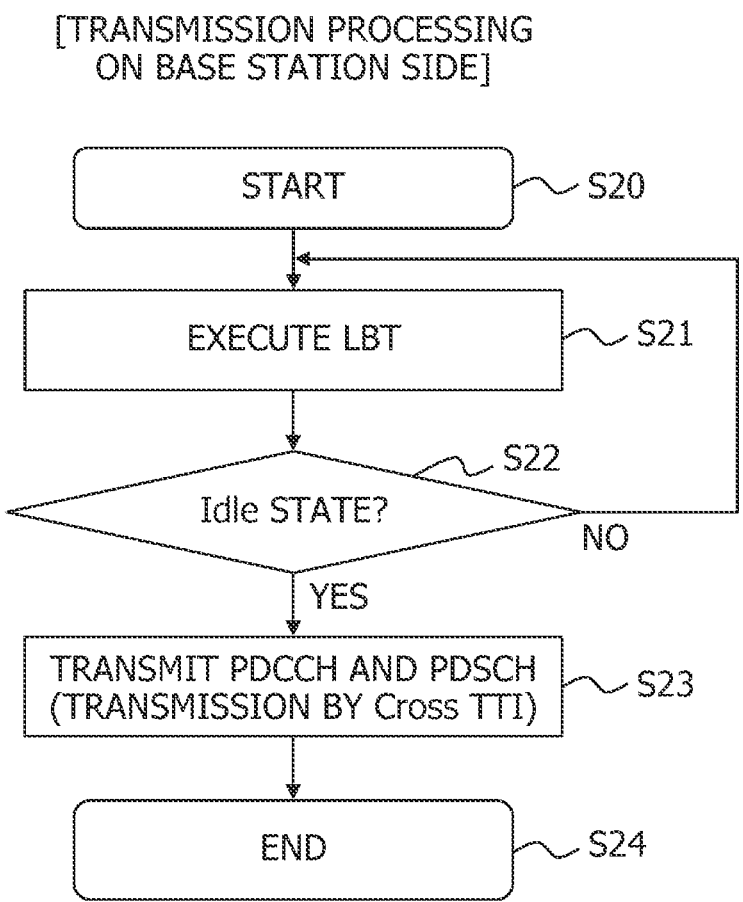

FIG. 25

| | SECOND AND SUBSEQUENT slots OF TRANSMISSION BURST | slot OTHER THAN LEFT |
|---|---|---|
| Option1 | monitoringSymbolsWithinSlot: 100000000000000 (ONE SearchSpace FROM Symbol#0) | monitoringSymbolsWithinSlot:101010101010 (UE Monitors SearchSpace (Symbol#0, #2, #4, #6, #8 #10, #12) EQUIVALENT TO SEVEN TIMES/slot) |
| Option2 | | monitoringSymbolsWithinSlot:100000000000000 (UE INTERPRETS ABOVE-MENTIONED PARAMETER BY POSITION RELATIVE TO TRANSMISSION START SYMBOL FOR EACH TRANSMISSION OPPORTUNITY. FURTHERMORE, RRC MESSAGE DEFINES SEVEN TRANSMISSION START TIMINGS OF, FOR INSTANCE, (Symbol#0, #2, #4, #6, #8 #10, #12) AS TRANSMISSION OPPORTUNITIES. IN THIS CASE, PROCESSING IS SET TO BE IDENTICAL TO PROCESSING OF Option 1) |

FIG. 26

```
┌──────────── PDSCH-Config(OR PUSCH-Config) ────────────┐
│                                                         │
│ (1) WHETHER Cross TTI IS TO BE EXECUTED                 │
│                                                         │
│ (2) SLOT NUMBER OF SLOT IN WHICH UNTRANSMITTED PART IS  │
│     TO BE TRANSMITTED                                   │
│                                                         │
│ (3) SYMBOL NUMBER OF SYMBOL AT WHICH TRANSMISSION IS    │
│     TO BE STARTED                                       │
│                                                         │
│   A ONE SYMBOL IS INSUFFICIENT → FOURTEENTH SYMBOL      │
│   B TWO SYMBOLS ARE INSUFFICIENT → THIRTEENTH SYMBOL    │
│   C THREE SYMBOLS ARE INSUFFICIENT → TWELFTH SYMBOL     │
│                        ...                              │
│   M THIRTEEN SYMBOLS ARE INSUFFICIENT → SECOND SYMBOL   │
│                                                         │
│ (4) WHETHER END SYMBOL OF NEXT SLOT OF                  │
│     HEAD SLOT IS TO BE SHIFTED TO SLOT SUBSEQUENT TO    │
│     NEXT SLOT                                           │
│                                                         │
│ (5) Ending Symbol (E))                                  │
│     (FOR INSTANCE, E = 6 WHEN S < 6, OR E = 13 OTHERWISE)│
│                                                         │
│ (6) PDCCH TRANSMISSION READY TIMING                     │
│     (FOR INSTANCE, SEVEN TRANSMISSION START TIMINGS, e.g.,│
│     (Symbol#0, #2, #4, #6, #8 #10, #12) CAN ALSO BE DEFINED)│
│                                                         │
└─────────────────────────────────────────────────────────┘
```

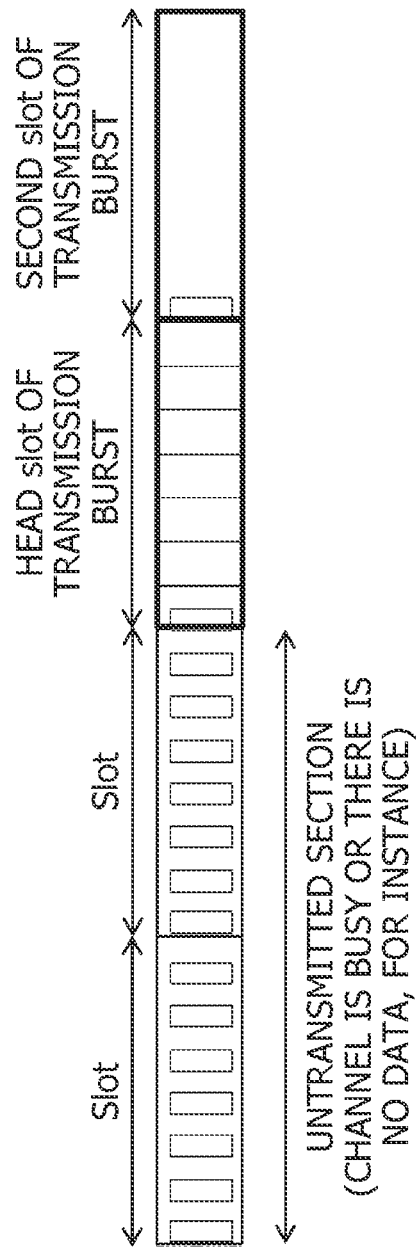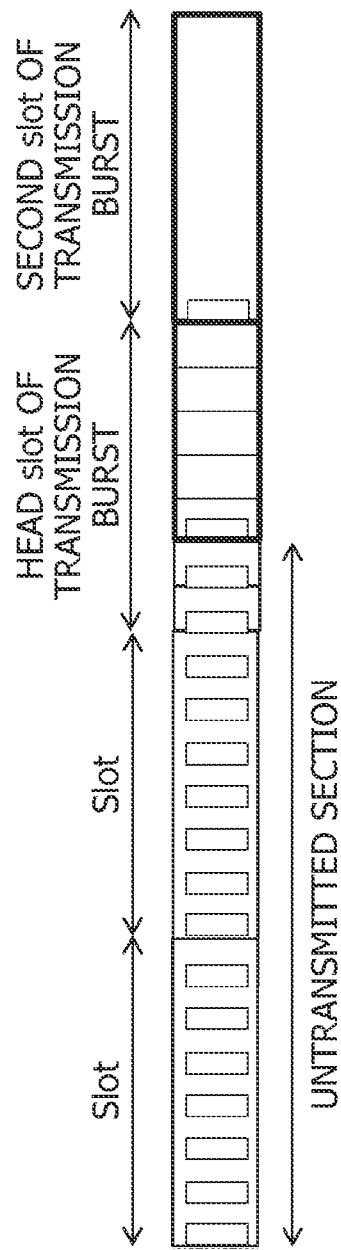

| PDSCH mapping type | Normal cyclic prefix | | |
|---|---|---|---|
| | S | L | S+L |
| Type A | {0,1,2,3} (Note 1) | {3,...,14} | {3,...,14} |
| Type B | {0,...,12} | {2,4,7} | {2,...,14} |
| Note 1: S = 3 is applicable only if dmrs-TypeA-Posiition= 3 | | | |

| PUSCH mapping type | Normal cyclic prefix | | |
|---|---|---|---|
| | S | L | S+L |
| Type A | 0 | {4,...,14} | {4,...,14} |
| Type B | {0,...,13} | {1,...,14} | {1,...,14} |

TRANSMISSION DEVICE, RECEPTION DEVICE, WIRELESS COMMUNICATION SYSTEM, AND COMMUNICATION METHOD

CROSS-REFERENCE TO RELATED APPLICATION

This application is a continuation application of International Application Number PCT/JP2018/029689 filed on Aug. 7, 2018 and designated the U.S., the entire contents of which are incorporated herein by reference.

FIELD

The present invention relates to a transmission device, a reception device, a wireless communication system, and a communication method.

BACKGROUND

The traffic of mobile terminals (smartphone and feature phone) occupies a considerable part of current network resources. In addition, there is a trend that the traffic used by mobile terminals increases continuously in the future.

Meanwhile, due to development of Internet-of-things (IoT) services (e.g., transportation system, smart meter, and system for monitoring apparatus or the like), there is a demand for dealing with services that have to meet various kinds of needed conditions. As a result, in the fifth generation mobile communication (5G or new radio (NR)) standard, there is a demand for a technology of achieving a higher data rate, a greater capacity, and lower latency, in addition to standard technologies (e.g., Non-Patent Literature 1 to 11) of the fourth generation mobile communication (4G).

Working groups (e.g., TSG-RAN WG1 and TSG-RAN WG2) of the third generation partnership project (3GPP) have been studying the technology of the fifth generation mobile communication standard (e.g., Non-Patent Literature 12 to 39).

As described above, in order to deal with various kinds of services, 5G is assumed to support a great number of use cases classified into enhanced mobile broad band (eMBB), massive machine type communications (MTC), and ultra-reliable and low latency communication (URLLC).

Meanwhile, 4G has introduced a function for implementing communication in Unlicensed spectrum (or Unlicensed band), which is a low frequency band (5 GHz band). Such a function includes long term evolution-licensed assisted access (LTE-LAA), for instance. LTE-LAA is, for instance, a technology of bundling the frequency band of Unlicensed spectrum and the frequency band of Licensed spectrum, and using those frequency bands at the same time. LTE-LAA can achieve a higher speed and a greater capacity, for instance.

LTE-LAA adopts a listen-before-talk (LBT) method for Unlicensed spectrum, which is a low frequency band (5 GHz band). In the LBT method, for instance, a transmission side executes carrier sensing (or carrier sense) before starting transmission of a signal, and starts to transmit data after confirming that a wireless channel is in an "Idle" state (state not in communication with other entities). The LBT method enables different networks, e.g., Wifi and LTE, to be implemented equally.

Meanwhile, LTE basically executes transmission/reception based on a subframe timing. When the LBT method is used at the subframe timing, a transmission opportunity may be confined because the transmission opportunity is given at the subframe timing.

In view of this, for LTE-LAA, a specification has been made—a specification of a method that enables transmission at both of the head timing (or head symbol) of a subframe and half the timing (or eighth symbol from head symbol) of the subframe. FIG. 30A and FIG. 30B represent the examples. As a result, for instance, it is possible to increase the transmission opportunity of the transmission side, and prevent transmission/reception processing by both of the transmission side and reception side from becoming complex excessively.

As illustrated in FIG. 30B, the amount of data included in a transport block (TB) #0 in the case of half the timing of a subframe is half the amount of data in the case of transmission at the timing of the head symbol of the subframe illustrated in FIG. 30A. Thus, for 3GPP, a specification has been made also such that the transmission side cuts the amount of data before coding, which is included in the TB #0, by half, and transmits the data.

Meanwhile, in 5G, like 4G, a base station determines (or schedules), for instance, allocation of radio resources, a code rate of error correction coding, and a modulation method, and the base station transmits the scheduling result to a terminal. In this case, the base station transmits downlink control information (DCI) including the scheduling result to the terminal by using physical downlink control channel (PDCCH). The terminal can use physical downlink shared channel (PDSCH) to extract data addressed to the own station from the received signal, or by using physical uplink shared channel (PUSCH), transmit data to the base station in accordance with the scheduling result included in the DCI.

FIG. 31A and FIG. 31B are diagrams representing allocation of resources by the DCI in a time direction, which is specified in 5G. FIG. 31A represents allocation of resources in the time direction for PDSCH, and FIG. 31B represents allocation of resources in the time direction for PUSCH. In FIG. 31A and FIG. 31B, for instance, "S" represents a start symbol in a slot, and "L" represents the number (or length) of continuous symbols, which is counted from the start symbol S.

FIG. 31C represents an example of allocation (or mapping, and in the following, allocation and mapping may be used without distinction) of resources in the time direction. For instance, a combination of S=2 and L=4 indicates that, in one slot, the start symbol is a third symbol counted from the head symbol (S=0), and the length is 4 symbols continuous from S=2. When resources are allocated in the time direction in this manner, the terminal extracts data addressed to the own station by using 4 symbols starting from S=2 in the case of PDSCH.

As illustrated in FIG. 31C, 4G specifies 1 subframe=14 symbols (=1 ms), whereas 5G specifies 1 slot=14 symbols. Furthermore, 5G enables use of a plurality of sub-carrier intervals, and the slot length changes depending on the sub-carrier interval. For instance, 1 slot=1 ms is satisfied when the sub-carrier interval is 15 kHz, whereas 1 slot=0.5 ms is satisfied when the sub-carrier interval is 30 kHz.

As illustrated in FIG. 31A and FIG. 31B, 5G enables allocation of radio resources in the time direction in units of symbol, and enables flexible allocation of radio resources.

CITATION LIST

Non-Patent Literature

NON PATENT LITERATURE 1: 3GPP TS 36.211 V15.1.0 (2018-03)

NON PATENT LITERATURE 2: 3GPP TS 36.212 V15.1.0 (2018-03)
NON PATENT LITERATURE 3: 3GPP TS 36.213 V15.1.0 (2018-03)
NON PATENT LITERATURE 4: 3GPP TS 36.300 V15.1.0 (2018-03)
NON PATENT LITERATURE 5: 3GPP TS 36.321 V15.1.0 (2018-03)
NON PATENT LITERATURE 6: 3GPP TS 36.322 V15.0.1 (2018-04)
NON PATENT LITERATURE 7: 3GPP TS 36.323 V14.5.0 (2017-12)
NON PATENT LITERATURE 8: 3GPP TS 36.331 V15.1.0 (2018-03)
NON PATENT LITERATURE 9: 3GPP TS 36.413 V15.1.0 (2018-03)
NON PATENT LITERATURE 10: 3GPP TS 36.423 V15.1.0 (2018-03)
NON PATENT LITERATURE 11: 3GPP TS 36.425 V14.1.0 (2018-03)
NON PATENT LITERATURE 12: 3GPP TS 37.340 V15.1.0 (2018-03)
NON PATENT LITERATURE 13: 3GPP TS 38.201 V15.0.0 (2017-12)
NON PATENT LITERATURE 14: 3GPP TS 38.202 V15.1.0 (2018-03)
NON PATENT LITERATURE 15: 3GPP TS 38.211 V15.1.0 (2018-03)
NON PATENT LITERATURE 16: 3GPP TS 38.212 V15.1.1 (2018-04)
NON PATENT LITERATURE 17: 3GPP TS 38.213 V15.1.0 (2018-03)
NON PATENT LITERATURE 18: 3GPP TS 38.214 V15.1.0 (2018-03)
NON PATENT LITERATURE 19: 3GPP TS 38.215 V15.1.0 (2018-03)
NON PATENT LITERATURE 20: 3GPP TS 38.300 V15.1.0 (2018-03)
NON PATENT LITERATURE 21: 3GPP TS 38.321 V15.1.0 (2018-03)
NON PATENT LITERATURE 22: 3GPP TS 38.322 V15.1.0 (2018-03)
NON PATENT LITERATURE 23: 3GPP TS 38.323 V15.1.0 (2018-03)
NON PATENT LITERATURE 24: 3GPP TS 38.331 V15.1.0 (2018-03)
NON PATENT LITERATURE 25: 3GPP TS 38.401 V15.1.0 (2018-03)
NON PATENT LITERATURE 26: 3GPP TS 38.410 V0.9.0 (2018-04)
NON PATENT LITERATURE 27: 3GPP TS 38.413 V0.8.0 (2018-04)
NON PATENT LITERATURE 28: 3GPP TS 38.420 V0.8.0 (2018-04)
NON PATENT LITERATURE 29: 3GPP TS 38.423 V0.8.0 (2018-04)
NON PATENT LITERATURE 30: 3GPP TS 38.470 V15.1.0 (2018-03)
NON PATENT LITERATURE 31: 3GPP TS 38.473 V15.1.1 (2018-04)
NON PATENT LITERATURE 32: 3GPP TR 38.801 V14.0.0 (2017-03)
NON PATENT LITERATURE 33: 3GPP TR 38.802 V14.2.0 (2017-09)
NON PATENT LITERATURE 34: 3GPP TR 38.803 V14.2.0 (2017-09)
NON PATENT LITERATURE 35: 3GPP TR 38.804 V14.0.0 (2017-03)
NON PATENT LITERATURE 36: 3GPP TR 38.900 V14.3.1 (2017-07)
NON PATENT LITERATURE 37: 3GPP TR 38.912 V14.1.0 (2017-06)
NON PATENT LITERATURE 38: 3GPP TR 38.913 V14.3.0 (2017-06)
NON PATENT LITERATURE 39: "Enriched feedback for adaptive HARQ". Nokia, Alcatel-Lucent Shanghai Bell, R1-1701020, 3GPP TSG RAN WG1 NR Ad-Hoc Metting, Spokane, 16-20 Jan. 2017

However, as described above, the transmission opportunity is two times at the maximum per subframe (=1 ms) for Unlicensed band in LTE-LAA. The transmission opportunity of two times at the maximum per subframe may degrade throughput.

SUMMARY

A transmission device, which is capable of wirelessly communicating with a reception device by using a first frequency band that does not need a license, the transmission device including, a controller configured to verify whether the first frequency band is not used by other transmission devices, and shift, in a time direction, a first symbol including a first control channel and a first shared channel in a first communication direction, or a second symbol including a second shared channel in a second communication direction different from the first communication direction, and a transmitter configured to transmit, to the reception device, a first control signal and first data, which are allocated to the first symbol, by using the first control channel and the first shared channel, respectively, or second data allocated to the second symbol by using the second shared channel.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A depicts a diagram illustrating an example of exchanging an RRC message and FIG. 5B depicts a diagram illustrating an example of a configuration of RRCReconfiguration message, respectively.

FIG. 6 depicts a diagram illustrating an example of IE included in PDSCH-Config or PUSCH-Config.

FIG. 9 depicts a diagram illustrating au example of information included in PDCCH.

FIG. 10A, FIG. 10B and FIG. 10C depict diagrams illustrating an example of information included in PDCCH.

FIG. 13 depicts a diagram illustrating an example of IE included in PDSCH-Config.

FIG. 14 depicts a diagram illustrating an example of information included in PDCCH.

FIG. 18 depicts a flow chart illustrating an example of operation in a base station.

FIG. 25 depicts a diagram illustrating an example setting of monitoring SymbolsWithinSlot.

FIG. 26 depicts a diagram illustrating an example of IE included in PDSCH-Config or PUSCH-Config.

FIG. 27A and FIG. 27B depict diagrams illustrating an example of monitoring.

DESCRIPTION OF EMBODIMENTS

Now, description is given in detail of an embodiment with reference to the drawings. The problem and embodiment example given in this specification are examples, and do not limit the scope of rights of the present application. In particular, the technology of the present application can be applied to descriptions with different expressions as long as those descriptions are equivalent to each other in terms of technology, and descriptions with different expressions do not limit the scope of rights. Embodiments can be combined appropriately as long as the details of processing do not contradict each other.

Terms and details of the technology described in specification documents and contributions as a communication standard e.g., 3GPP, may be used appropriately as terms used in this specification and details of the technology described in this specification. Such specification documents include 3GPP TS 38.211 V15.1.0 (2018-03), for instance.

The specification documents of 3GPP are updated as needed. Thus, the latest specification document at the time of filing the present application may be used as the above-mentioned specification documents. Terms and details of the technology described in the latest specification document may be used appropriately in this specification.

In the following, description is given in detail of an embodiment example of a base station, a terminal, a wireless communication system, and a communication method disclosed in the present application with reference to the drawings. The following embodiment does not limit the disclosed technology.

First Embodiment

<1. Example of Configuration of Wireless Communication System>

Figure 1:
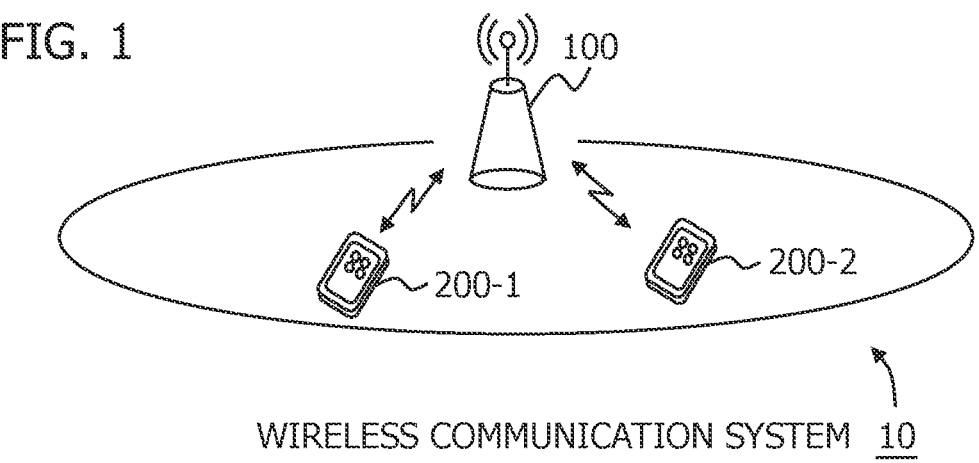
FIG. 1 depicts a diagram illustrating an example of a configuration of a wireless communication system.

FIG. 1 depicts a diagram illustrating an example of a configuration of a wireless communication system 10 in a first embodiment.

The wireless communication system 10 includes a base station apparatus (hereinafter sometimes referred to as "base station") 100 and a plurality of terminal devices (hereinafter sometimes referred to as "terminal") 200-1 and 200-2.

The base station 100 is a wireless communication apparatus for wirelessly communicating with the terminals 200-1 and 200-2 in a service available range (or cell range) of the own station, and providing various kinds of services, e.g., a call service or a web browsing service.

The base station 100 executes scheduling as described above, and determines, for instance, allocation of radio resources, the code rate, and the modulation method for each terminal 200-1 or 200-2. Then, the base station 100 includes the scheduling result in a control signal, and uses the PDCCH to transmit the control signal to the terminals 200-1 and 200-2. Each terminal 200-1 or 200-2 can use PDSCH to extract data addressed to the own station from the received signal, or use PUSCH to transmit data to the base station 100 in accordance with the scheduling result included in the control signal.

The direction of communication from the base station 100 to the terminal 200-1 or 200-2 may be referred to as "downlink direction", and the direction of communication from the terminal 200-1 or 200-2 to the base station 100 may be referred to as "uplink direction".

For instance, the base station 100 may serve as the transmission device, and the terminals 200-1 and 200-2 may serve as the reception device in the downlink direction, whereas the terminals 200-1 and 200-2 may serve as the transmission device, and the base station 100 may serve as the reception device in the uplink direction.

The terminals 200-1 and 200-2 can also transmit a control signal in the uplink direction. In this case, the terminals 200-1 and 200-2 use physical uplink control channel (PUCCH) to transmit an uplink control signal. Examples of the uplink control signal include, for instance, an acknowledgement (ACK, meaning positive response) signal and a negative acknowledgement (NACK) signal (hereinafter sometimes referred to as "ACK" or "NACK") indicating whether data has been received normally.

The terminals 200-1 and 200-2 are wireless communication devices capable of performing wireless communication, e.g., a feature phone, a smartphone, a personal computer, a tablet terminal, and a game device. Each terminal 200-1 or 200-2 can be provided with various kinds of services described above via the base station 100.

FIG. 1 represents an example of the base station 100 wirelessly communicating with the two terminals 200-1 and 200-2. For instance, the base station 100 of the wireless communication system 10 may wirelessly communicate with one terminal 200-1, or may wirelessly communicate with three or more terminals. The number of terminals 200-1 and 200-2 may be one or more.

In the first embodiment, the base station 100 and the terminals 200-1 and 200-2 can wirelessly communicate with each other by using Unlicensed band.

The frequency to be used in wireless communication is allocated by each country giving a license to a specific operator in consideration of allocation of frequencies established by international telecommunication radio communications sector (ITU-R) and circumstances of each country. The operator can occupy the licensed frequency to run a mobile communication business (or wireless communication business). The frequency band licensed and allocated to the operator may be referred to as "Licensed band", for instance. Meanwhile, Unlicensed band is for instance, a frequency band available to a plurality of operators without a license. Unlicensed band is, for instance, a frequency band that does not need a license, and Licensed band is, for instance, a frequency band that needs a license. Examples of Unlicensed band include, for instance, industry science medical (ISM) band and a 5 GHz band.

When the base station 100 and the terminals 200-1 and 200-2 wirelessly communicate with each other by using unlicensed band, the base station 100 and the terminals 200-1 and 200-2 use the LBT method to verify whether the frequency band is available. For instance, the base station 100 and the terminals 200-1 and 200-2 execute the following processing.

Specifically, the base station 100 and the terminals 200-1 and 200-2 execute carrier sense in an available frequency band within Unlicensed band. When the frequency band is in an "Idle" state, the base station 100 and the terminals 200-1 and 200-2 use the frequency band to perform wireless communication. The "Idle" state is, for instance, a state in which a signal strength of a received signal is weaker than a threshold value. In this case, the base station 100 and the terminals 200-1 and 200-2 have confirmed that the frequency band is not used by other base stations or terminals, and can use the frequency band. On the other hand, when the frequency band is in a "Busy" state, the base station 100 and the terminals 200-1 and 200-2 do not use the frequency band. The "Busy" state is, for instance, a state in which the signal strength of the received signal is equal to or greater than the threshold value. In this case, after the base station 100 and the terminals 200-1 and 200-2 have confirmed the "Busy" state and a predetermined period of time has elapsed, the base station 100 and the terminals 200-1 and 200-2 execute carrier sense again for the frequency band.

Specific operation of carrier sense follows the method described in 3GPP TS 37.213 V15.0.0 (2018-06), for instance. Depending on details of a signal to be transmitted or the like, this method defines a case in which the signal can be transmitted in the "Idle" state through one time of carrier sense, and a case in which the signal can be transmitted only after defined number of times of detected "Idle" state is achieved In both cases, the result of one time of carrier sense immediately before transmission of the signal is needed (assumed) to be the "Idle" state.

The base station 100 and the terminals 200-1 and 200-2 can wirelessly communicate with each other by using not only Unlicensed band but also Licensed band.

In the following, Unlicensed band may be denoted by, for instance, Unlicensed-band, and Licensed band may be denoted by, for instance, Licensed-band.

The terminal 200-1 or 200-2 may be denoted by the terminal 200.

A control signal in the downlink direction may be referred to as "PDCCH", for instance. Thus, transmission of a control signal in the downlink direction may be referred to as "transmission of PDCCH", for instance. Data in the downlink direction may be referred to as "PDSCH". Furthermore, for instance, a control signal in the uplink direction may be referred to as "PUCCH", and data in the uplink direction may be referred to as "PUSCH".

In the following, a control signal and DCI may be used without distinction.

Furthermore, in the following, LBT and carrier sense may be used without distinction.

<2. Radio Resources in Time Direction>

Figure 2A:
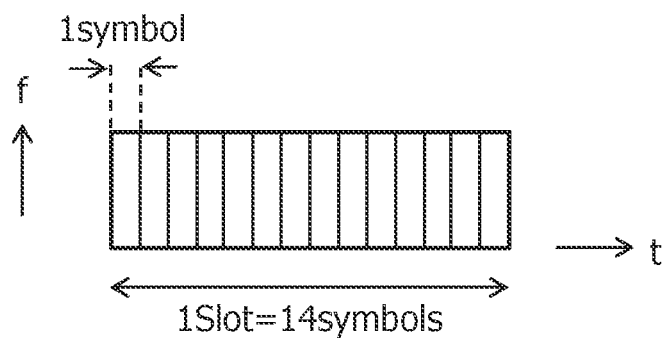
FIG. 2A depicts a diagram illustrating an example of a configuration of one slot and FIG. 2B and FIG. 2C depict diagrams illustrating an example of transmission of TB.

FIG. 2A depicts a diagram illustrating an example of a configuration of one slot defined by 5G. As described above, LTE specifies 14 symbols as 1 subframe. However, as illustrated in FIG. 2A, 5G specifies 14 symbols as 1 slot. FIG. 2A represents one slot in a certain frequency band within Unlicensed-band, for instance.

Figure 2B:
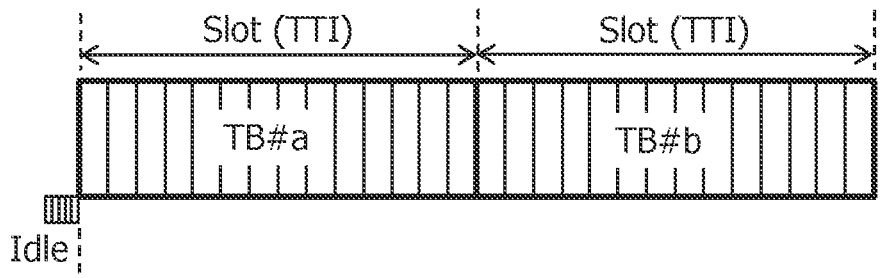

FIG. 2B depicts a diagram illustrating an example of transmission of TB in the time direction in a certain frequency band within Unlicensed-band.

For instance, the base station 100 executes carrier sense for this frequency band, and confirms that the frequency band is in the "Idle" state. Thus, the base station 100 uses all the symbols of the head slot to transmit data included in TB #a. Then, for instance, the base station 100 also uses all the symbols of the next slot to transmit data of TB #b allocated to the next slot. FIG. 2B represents an example of transmission of data included in each TB in accordance with allocation to each slot.

In the following, transmission of data included in TB may be referred to as "transmission of TB", for instance.

Figure 7A:
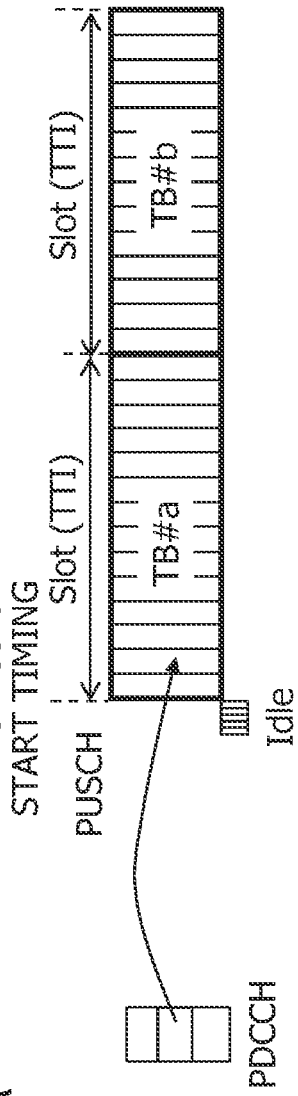
FIG. 7A and FIG. 7B depict diagrams illustrating an example of transmitting PUSCH.

FIG. 2B also represents TTI. TTI represents, for instance, an arrival time interval of a TB set, and represents the minimum period of a scheduling period (or cycle) allocated by one control signal to be transmitted by using PDCCH. Thus, regarding TTI, for instance, one PDCCH is allowed to include a plurality of TTIs. FIG. 7A represents an example of one PDCCH scheduling two TTIs, although details thereof are described later.

For instance, in the example of FIG. 2B, one PDCCH allocates TB #a to the head slot, and another PDCCH allocates TB #b to the next slot of the head slot. Thus, the head slot serves as one TTI, and the next slot serves as another TTI. For instance, when two PDCCHs are allocated to separate symbols in one slot, this means that one slot includes two TTIs.

Figure 2C:
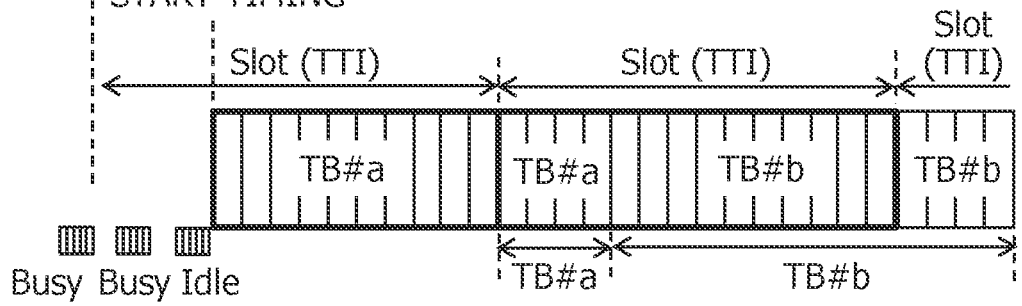

FIG. 2C depicts also a diagram representing an example of transmission of TB in the time direction identical to FIG. 2B. The example of FIG. 2C is different from that of FIG. 2B in that FIG. 2C represents an example of shifting a transmission start timing by carrier sense.

In the example of FIG. 2C, the first symbol of the head slot represents the "Busy" state as a result of carrier sense. Carrier sense is executed after that, and the third symbol also represents the "Busy" state. Next, carrier sense is executed after that to result in the "Idle" state. Thus, transmission of a signal is started from the fifth symbol. In the example of FIG. 2C, the fifth symbol (symbol 4 on the assumption that symbol 0 is the head symbol) of the head slot is the data transmission start timing.

When FIG. 2B and FIG. 2C represent examples of transmission in the downlink direction, a head symbol (first symbol in the example of FIG. 2B and a fifth symbol in the example of FIG. 2C) at the transmission start timing is used to transmit PDCCH and PDSCH. 5G is different from 4G in that PDCCH and PDSCH can be allocated to one symbol. In this case, for instance, the base station 100 executes transmission illustrated in FIG. 2B and FIG. 2C.

On the other hand, when FIG. 2B and FIG. 2C represent examples of transmission in the uplink direction, a head symbol at the transmission start timing is used to transmit PUCCH and PUSCH. In this case, for instance, the terminal 200 executes transmission illustrated in FIG. 2B and FIG. 2C.

Meanwhile, as illustrated in FIG. 2B, all the 14 symbols of one slot are allocated to TB #a. In the example of FIG. 2C, transmission is started from the fifth symbol, and thus although data equivalent to 10 symbols included in TB #a can be transmitted in the head slot, data equivalent to the remaining 4 symbols is not allowed to be transmitted. In this case, in the example of FIG. 2C, the data equivalent to the remaining 4 symbols included in TB #a, which has failed to be transmitted, is transmitted by using the first 4 symbols of the next slot.

Thus, the data equivalent to the 14 symbols included in TB #a is transmitted by using the 10 symbols of the head slot and the first 4 symbols of the next slot. In this case, the head slot and the next slot are, for instance, resources in the time direction allocated by different PDCCHs. In this case, resources in the time direction are allocated to data of TB #a across two slots allocated by different PDCCHs. For instance, a scheduling period allocated by one PDCCH is one TTI, and thus the data of TB #a is transmitted to the same terminal 200 across two TTIs.

When not all the data has been transmitted in the head slot (or head TTI) due to carrier sense, pieces of data that have failed to be transmitted are transmitted in the next TTI, which is sometimes referred to as "Cross TTI" (or Cross-TTI), for instance. Alternatively, Cross-TTI is, for instance, to transmit the same data across a plurality of TTIs. For instance, in FIG. 2C, not all TB #a has been transmitted in the head TTI, and thus TB #a has been transmitted completely in the next TTI, which means transmission by Cross-TTI.

Cross-TTI can be set by a radio resource control (RRC) message or PDCCH, for instance. Details thereof are described later.

In this manner, in the first embodiment, for instance, as illustrated in FIG. 2C, a symbol including PDCCH and PDSCH, or a symbol including PUCCH and PUSCH can be shifted in the time direction. Thus, like LTE-LAA, not only a head symbol (first symbol) and an intermediate symbol (eighth symbol from head symbol) in a slot, but also other symbols can be used to transmit data as illustrated in FIG. 2C. Thus, in the first embodiment, the transmission opportunity increases compared to the case of transmitting data by using a head symbol and an intermediate symbol in a slot, which enables improvement in throughput.

Furthermore, in the first embodiment, Cross-TTI is used to transmit data addressed to the same terminal 200. In this case, as illustrated in the example of FIG. 2C, the transmission side transmits remaining data of TB #a, which has failed to be transmitted in the first TTI, in the next TTI (or next slot) of the head TTI (or slot) without waiting for ACK or NACK. Thus, the transmission device can transmit data without waiting for ACK or NACK, and can improve throughput compared to the case of waiting for ACK or NACK and then executing transmission.

Furthermore, in the first embodiment, the transmission side transmits a signal, which has failed to be transmitted in the head slot due to carrier sense, in the next slot as it is. Compared to the case of subjecting the signal to certain processing, the signal is transmitted as it is in the first embodiment, and thus it is also possible to reduce complexity of transmission processing by the transmission side and reception processing by the reception side.

In the following, description is given of the first embodiment by using different cases. First, a relationship between an RRC message and PDCCH is described. Next, a case of setting Cross-TTI by an RRC message when 1) PDCCH and PDSCH are shifted is described as a specific example. Next, a case of setting Cross-TTI by an RRC message when 2) PUSCH is shifted is described. Next, a case of setting Cross-TTI by PDCCH when 3) PDCCH and PDSCH are shifted is described.

As illustrated in FIG. 2B, all the symbols in the next slot of the head slot are allocated to TB #b. In this case, as illustrated in FIG. 2C, the transmission device is not allowed to transmit data equivalent to 4 symbols of TB #b in the next slot of the head slot due to Cross-TTI of TB #a. In this case, the transmission device can also transmit the data equivalent to 4 symbols, which has failed to be transmitted, by using a slot (slot subsequent to next slot of head slot) subsequent to the next slot. The transmission device can also transmit TB #b by using Cross-TTI.

In the example illustrated in FIG. 2C, description is given of an example of executing carrier sense in units of two symbols, but carrier sense may be executed in units of one symbol or in units of three or more symbols.

<3. Relationship Between RRC Message and PDCCH>

Figure 3:
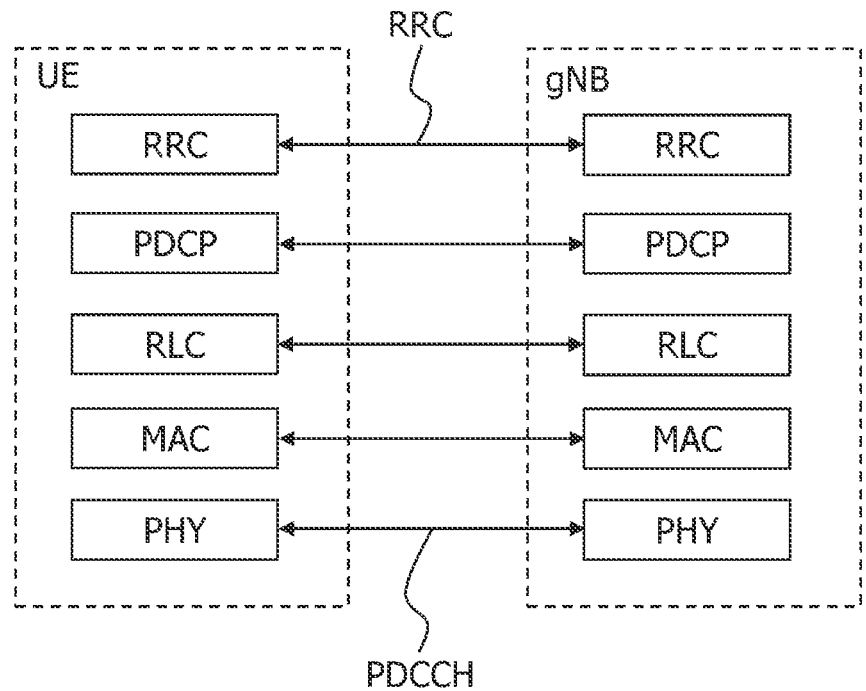
FIG. 3 depicts a diagram illustrating an example of a protocol stack.

FIG. 3 depicts a diagram illustrating an example of a protocol stack between the base station 100 and the terminal 200 in 5G. As illustrated in FIG. 3, PDCCH is included in the lowest physical layer (PHY), and an RRC message is included in a an RRC layer higher than the physical layer.

PDCCH is transmitted every TTI, for instance. Thus, compared to an RRC message, PDCCH has a greater overhead, but can change control in real time, which means flexibility.

On the other hand, an RRC message is transmitted every hundreds of milliseconds, for instance. Thus, compared to PDCCH, an RRC message has a less overhead, but has a difficulty in changing control in real time, which means less flexibility.

PDCCH and an RRC message can be said to have a trade-off relationship with respect to the overhead and flexibility, for instance.

<4.1 Setting of Cross-TTI by RRC Message When PDCCH and PDSCH Are Shifted>

Figure 4A:
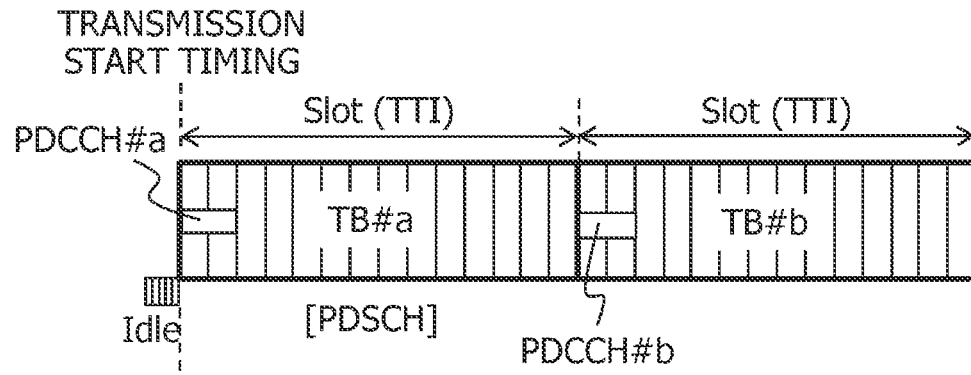
FIG. 4A and FIG. 4B depict diagrams illustrating an example of transmitting PDCCH and PDSCH.
Figure 4B:
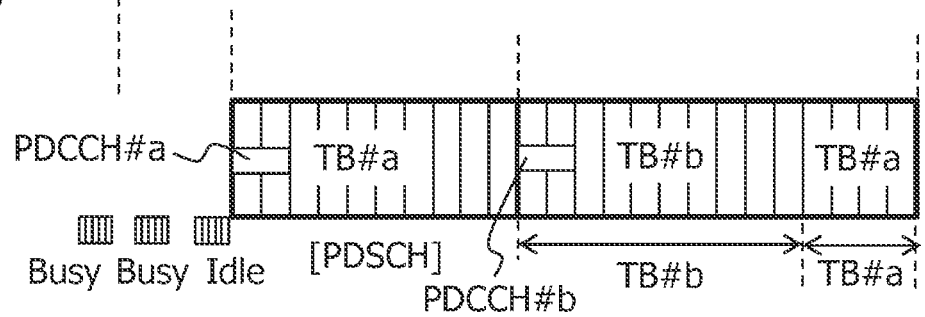

FIG. 4A and FIG. 4B depict diagrams illustrating examples of transmitting PDCCH and PDSCH.

In the example of FIG. 4A, the base station 100 allocates data included in TB #a to all the symbols of the head slot in the downlink direction by scheduling, and allocates data of TB #b to all the symbols of the next slot of the head slot. Furthermore, in the example of FIG. 4A, PDCCH is allocated to the first and second symbols. 5G allows the length of from one to three symbols for PDCCH. Thus, PDCCH may be included only in the head symbol, or may be included in the first to third symbols.

In the example of FIG. 4A, the base station 100 has executed carrier sense in Unlicensed-band, and confirmed the "Idle" state at the time point of the first symbol of the head slot. Thus, the base station 100 transmits PDCCH #a and PDSCH (TB #a) allocated to respective symbols in order from the first symbol. Then, the base station 100 transmits PDCCH #b and PDSCH (TB #b) allocated to respective symbols in order from the first symbol also in the next slot of the head slot.

Meanwhile, in the example of FIG. 4B, the base station 100 has executed carrier sense in Unlicensed-band, and confirmed the "Busy" state at the time point of the first symbol of the head slot. Thus, the base station 100 does not transmit PDCCH #a and PDSCH (TB #a), or subsequent PDCCH #b and PDSCH (TB #b) at this timing.

After a predetermined period of time has elapsed since execution of first carrier sense (after a period equivalent to two symbols has elapsed in the example of FIG. 4A), the base station 100 has executed carrier sense again, and confirmed the "Busy" state at the time point of the third symbol of the head slot. Thus, the base station 100 does not also execute transmission at this time point.

Then, after a predetermined period of time has elapsed since execution of second carrier sense, the base station 100 has executed carrier sense again, and confirmed the "Idle" state at the time point of the fifth symbol of the head slot. Thus, the time point of the fifth symbol is the transmission start timing, and the base station 100 transmits PDCCH #a and PDSCH (TB #a). In this case, the base station 100 transmits data of TB #a, which is allocated to 10 symbols of from the fifth symbol to the fourteenth symbol of the head slot. Thus, within TB #a allocated to all the symbols of the head slot, TB #a equivalent to the remaining 4 symbols, which is allocated to eleventh to fourteenth symbols, is not transmitted in the head slot.

Then, the base station 100 uses Cross-TTI to transmit TB #a equivalent to the remaining 4 symbols. In other words, in the example of FIG. 4B, the base station 100 uses the last 4 symbols (eleventh to fourteenth symbols) of the next slot to transmit TB #a equivalent to the remaining 4 symbols, which has not been transmitted. In this case, the base station 100 transmits the data equivalent to the remaining 4 symbols by using the last 4 symbols of the next slot without receiving ACK or NACK from the terminal 200.

DCI to be transmitted by using PDCCH includes a start symbol S and a length (hereinafter sometimes referred to as "length") L continuous from the start symbol as resources allocated to PDSCH in the time direction. In the example of FIG. 4A, DCI including S=0 and L=14 is transmitted by using PDCCH.

In the first embodiment, the base station 100 sets details of the start symbol S and the length L included in DCI to the same content also when there are a plurality of transmission opportunities due to carrier sense. Thus, as illustrated in FIG. 4A, the base station 100 transmits DCI in which the start symbol S has the value of S=0 and the length L has the value of L=14 for both of PDCCH #a to be transmitted from the first symbol as illustrated in FIG. 4A and PDCCH #a to be transmitted from the fifth symbol as illustrated in FIG. 4B.

In this case, in the example of FIG. 4A, the terminal 200 can receive all of PDCCH and PDSCH with S=0 and L=14. However, in the example of FIG. 4B, the terminal 200 has not received PDDCH or PDSCH at the timepoint of S=0. Furthermore, the terminal 200 has not received PDSCH equivalent to the length of L=14 when a one-slot period ends. In other words, the terminal 200 can grasp insufficient PDSCH based on the start symbol S and the length L. In this case, the terminal 200 interprets that the insufficient PDSCH is "untransmitted". Details thereof are described later based on an operation example.

In the first embodiment, the start symbol S is defined to be a symbol at which a transmission burst has actually started to be transmitted, for instance. For instance, in the example of FIG. 4A, a transmission burst has started to be transmitted at the first symbol (symbol 0) in one slot, and in the example of FIG. 4B, a transmission burst has started to be transmitted at the fifth symbol (symbol 4). In both cases, the start symbol S is set to S=0.

Next, description is given of an example of setting Cross-TTI by an RRC message.

FIG. 5A depicts a diagram illustrating an example of exchanging an RRC message. In FIG. 5A, for instance, user equipment (UE) corresponds to the terminal 200, and Network corresponds to the base station 100.

The base station 100 transmit an RRCReconfiguration message to the terminal 200 (S10). On the other hand, when the terminal 200 has received the RRCReconfiguration message, the terminal 200 transmits an RRCReconfigurationComplete message to the base station 100 (S11).

FIG. 5B depicts a diagram illustrating an example of a configuration of the RRCReconfiguration message. The RRCReconfiguration message includes various kinds of content in hierarchical structure, and a part thereof is PDSCH-Config and PUSCH-Config.

PDSCH-Config is used for setting a PDSCH parameter for individual UE, for instance. PUSCH-Config is used for setting a PUSCH parameter for individual UE, for instance. Details of information elements (IE) included in each of PDSCH-Config and PUSCH-Config are described in 3GPP TS 38.331 V15.1.0 (2018-03).

In the first embodiment, the base station 100 additionally includes IE for implementing Cross-TTI in PDSCH-Config, and transmits PDSCH-Config.

FIG. 6 depicts a diagram illustrating an example of IE included in PDSCH-Config. IE includes (1) whether Cross-TTI is to be executed, (2) the slot number of a slot in which an untransmitted part is to be transmitted, (3) the symbol number of a symbol at which transmission is to be started, and (4) whether or not the end symbol of the slot next to the first slot is further shifted to the next slot.

(1) "whether Cross-TTI is to be executed" represents, for instance, whether data is to be transmitted across TTIs (or by using a plurality of TTIs), and can be indicated by one bit.

(2) "the slot number of a slot in which an untransmitted part is to be transmitted" represents, for instance, the slot number of a slot to be used for transmitting PDSCH of an untransmitted part by using Cross-TTI. In the example of FIG. 4B, the untransmitted part (data equivalent to remaining 4 symbols) of TB #a is transmitted in the next slot of the head slot, and thus when the slot number of the head slot is set as "0", "the slot number of a slot in which an untransmitted part is to be transmitted" is "1".

(3) "the symbol number of a symbol at which transmission is to be started" represents, for instance, a symbol number of a symbol at which transmission is to be started in the slot with (2) "the slot number of a slot in which an untransmitted part is to be transmitted". For instance, in the example of FIG. 4B, transmission is started from the eleventh symbol, and thus the symbol number of a symbol at which transmission is to be started is "10".

(3) "the symbol number of a symbol at which transmission is to be started" is different for each case as illustrated in FIG. 6. This is because, for instance, when the base station 100 executes carrier sense, the base station 100 is maybe unable to grasp a timing at which transmission can be started without actually executing transmission. As described above, the terminal 200 can interpret that PDSCH of an untransmitted part is "untransmitted" based on the start symbol S, the length L, actually received data, and other information, and can also grasp how many symbols of data are insufficient. Then, the terminal 200 can use (2) "the slot number of a slot in which an untransmitted part is to be transmitted" and (3) "the symbol number of a symbol at which transmission is to be started", which are included in PDSCH-Config, to receive data of the untransmitted part from the symbol in that slot.

(4) "whether or not the end symbol of the slot next to the first slot is further shifted to the next slot" represents, for instance, the following details. Specifically, the base station 100 transmits an untransmitted part in the nest slot of the head slot (or TTI) by Cross-TTI. However, this reduces the number of symbols to which data to be transmitted is allocated in the nest slot of the head slot, and thus the base station 100 is not allowed to transmit the data. In the example of FIG. 4B, data of TB #b allocated to all the symbols of the next slot of the head slot has a part that is not allowed to be transmitted due to Cross-TTI of TB #a. Thus, (4) is used to add, to PDSCH-Config, IE representing whether to shift to the slot subsequent to the next slot. In the example of FIG. 4B, the end symbol of the untransmitted part of TB #b is not shifted to the slot (third slot) subsequent to the next slot. In this case, "whether an end symbol of the next slot of the head slot indicates shifting to the slot subsequent to the next slot" is set to "0" (=Shifting is not performed). This IE indicates "1" in the case of shifting, for instance.

The example of giving different cases of (3) "the symbol number of a symbol at which transmission is to be started" illustrated in FIG. 6 is only one example. As different cases, for instance, "the symbol number of a symbol at which transmission is to be started" may be set to 1 when one symbol is insufficient, and may be set to 2 when two symbols are insufficient.

<4.2 Setting of Cross-TTI by RRC Message When PUSCH is Shifted>

Figure 7B:
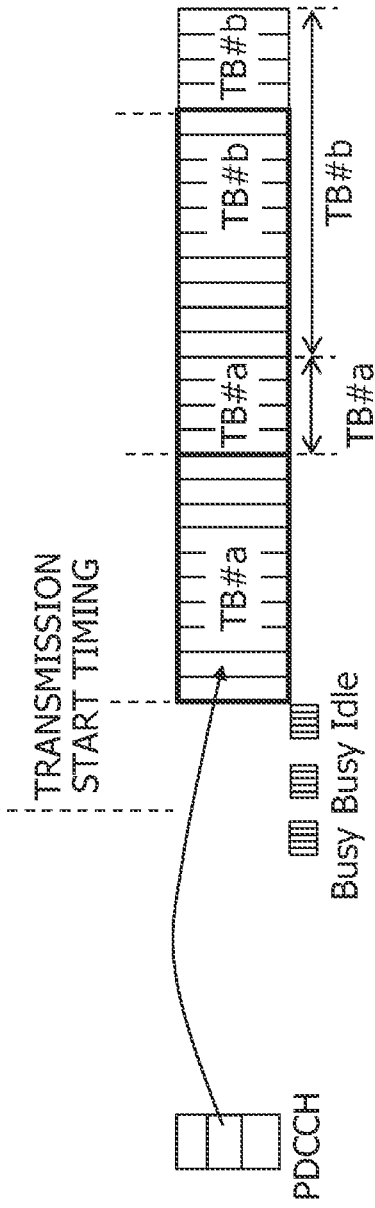

FIG. 7A and FIG. 7B depict diagrams illustrating examples of transmitting PUSCH.

As illustrated in FIG. 7A, the base station 100 uses scheduling to allocate TB #a to all the symbols of the head slot in the uplink direction, and allocate TB #b to all the symbols of the next slot, and transmits the result of allocation.

In the example of FIG. 7A, the terminal 200 has executed carrier sense in Unlicensed-band, and verified the "Idle" state at the time point of the first symbol of the head slot, and thus transmits PUSCH (TB #a) in accordance with PDCCH in order from the first symbol. Then, the terminal 200 transmits PUSCH (TB #b) in order from the first symbol also in the next slot.

Meanwhile, in the example of FIG. 7B, the terminal 200 has executed carrier sense in Unlicensed-band, and confirmed the "Busy" state at the time point of the first symbol of the head slot. Thus, after a predetermined period of time has elapsed, the terminal 200 has executed carrier sense in Unlicensed-band again, and also confirmed the "Busy" state at the time point of the third symbol. Then, after a predetermined period of tune has elapsed, the terminal 200 has executed carrier sense in Unlicensed-band again, and now confirmed the "Idle" state. The start time point of the fifth symbol is the transmission start timing, and the terminal 200 transmits PUSCH (TB #a). The terminal 200 shifts the transmission start timing of TB #a, and transmits TB #a.

In this case, the terminal 200 transmits data of TB #a, which is allocated to 10 symbols of from the fifth symbol to the fourteenth symbol of the head slot, in the head slot. Thus, within TB #a allocated to all the symbols of the head slot, the terminal 200 is not allowed to transmit TB #a equivalent to the remaining 4 symbols, which is allocated to eleventh to fourteenth symbols, in the head slot.

Thus, the terminal 200 uses Cross-TTI to transmit TB #a equivalent to the remaining 4 symbols. In other words, in the example of FIG. 7B, the terminal 200 uses the first 4 symbols (first to fourth symbols) of the next slot to transmit TB #a equivalent to the remaining 4 symbols, which has not been transmitted.

Then, like the terminal 200 in the downlink direction, the base station 100 can grasp insufficient PUSCH based on the start symbol S and the length L. For instance, in the example of FIG. 7B, when the base station 100 has transmitted S=0 and L=14 by PUCCH, but has detected that the amount of data received from the terminal 200 is equivalent to only 10 symbols, the base station 100 can grasp insufficient PUSCH. In this case, the base station 100 interprets that the insufficient PUSCH is "untransmitted".

Next, description is given of an example of setting Cross-TTI by an RRC message.

FIG. 6 depicts a diagram illustrating an example of IE of PUSCH-Config included in an RRCReconfiguration message. Like PDSCH-Config, each IE of PUSCH-Config is also specified in 3GPP TS 38.331 V15.1.0 (2018-03). In the first embodiment, IE illustrated in FIG. 6 is further included in PUSCH-Config in order to set Cross-TTI.

As illustrated in FIG. 6, IE is the same as IE of PDSCH-Config, and details thereof are also the same.

For instance, in the example of FIG. 7B, (1) "whether Cross-TTI is to be executed" is "1" (=Cross-TTI is to be executed), (2) "the slot number of a slot in which an untransmitted part is to be transmitted" is "1" (next slot when head slot is set as "0"). (3) "the symbol number of a symbol at which transmission is to be started" is "0", and (4) "whether to shift to the next slot" is "1" (=shifting is performed).

As illustrated in FIG. 5A, the terminal 200 receives an RRCReconfiguration message from the base station 100 (S10 and S11). As illustrated in FIG. 6, the RRCReconfiguration message includes IE for Cross-TTI. As illustrated in FIG. 7B, the terminal 200 transmits data equivalent to the remaining 4 symbols in accordance with this IE by using first to fourth symbols of the next slot of the head slot. In this case, data of TB #b, which is allocated to eleventh to fourteenth symbols, is "untransmitted". The terminal 200 shifts the "untransmitted" portion of data to the next slot (slot subsequent to the next slot of head slot) in accordance with (4) of IE illustrated in FIG. 6, and transmits the portion of data by Cross-TTI.

Figure 29A:
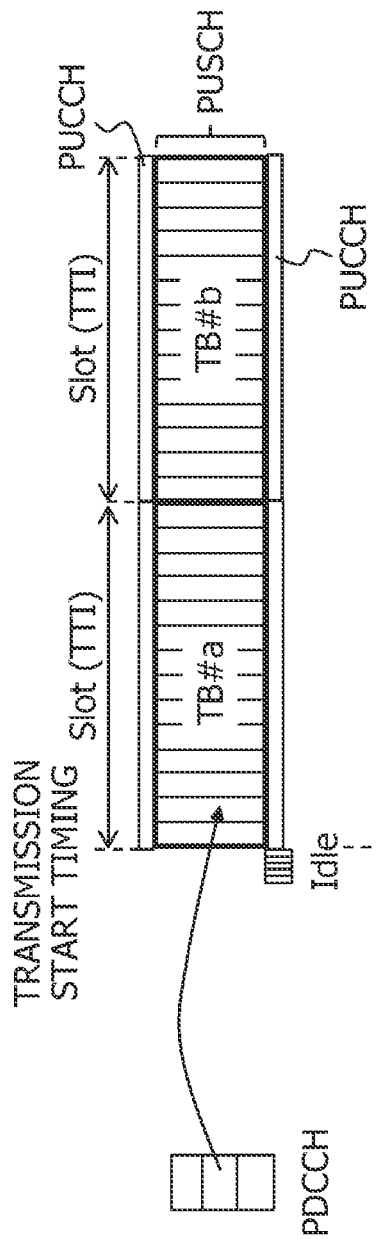
FIG. 29A and FIG. 29B depict diagrams illustrating an example of transmitting PUCCH and PUSCH.
Figure 29B:
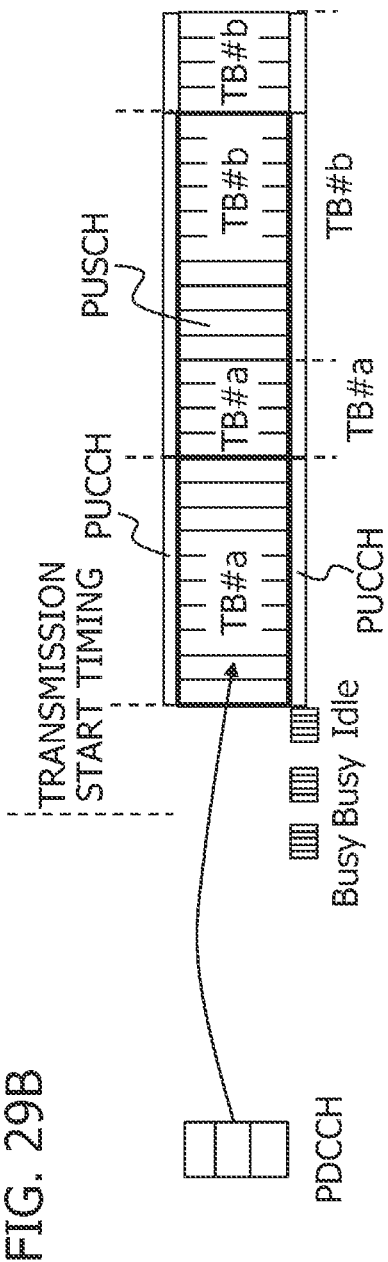
Figure 30A:
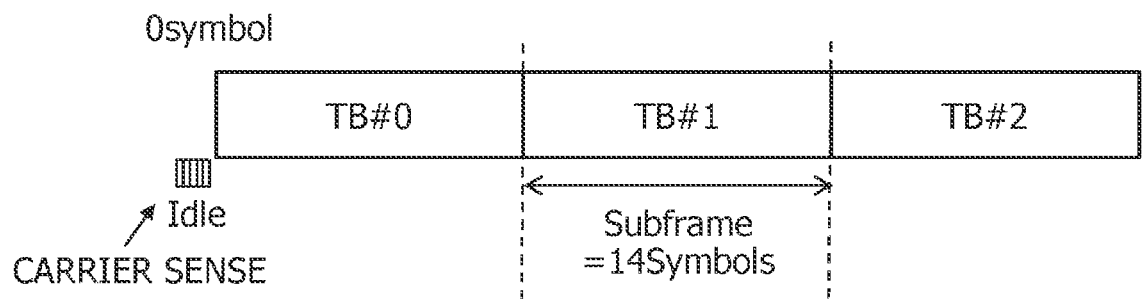
FIG. 30A and FIG. 30B depict diagrams illustrating an example of transmission of TB.
Figure 30B:
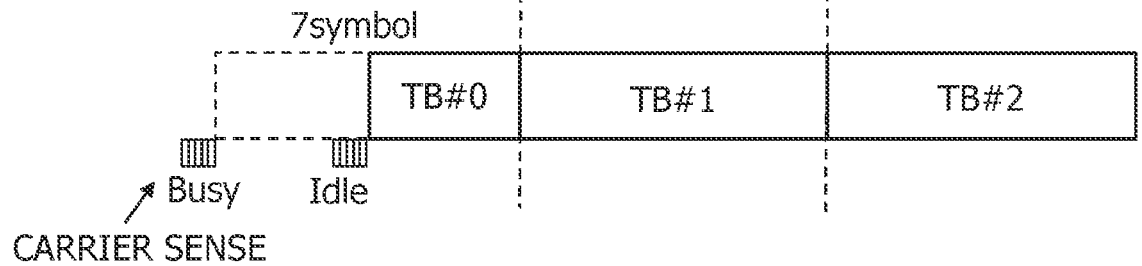
Figures 31A, 31B, 31C:
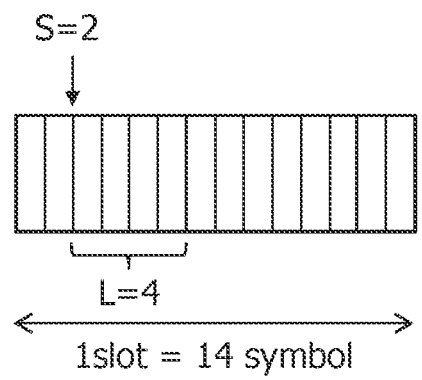
FIG. 31A and FIG. 31B depict diagrams illustrating a specification of a start symbol and a length and FIG. 31C depicts a diagram illustrating an example of setting a start symbol and a length, respectively.

FIG. 29A and FIG. 29B represent examples of transmitting PUCCH and PUSCH. FIG. 29A and FIG. 29B represent an example of adding PUCCH to the examples of FIG. 7A and FIG. 7B, respectively. PUCCH is added to or not added to PUSCH by DCI, for instance.

The examples of transmission in FIG. 29A and FIG. 29B can be implemented like the cases of FIG. 7A and FIG. 7B respectively, for instance. In this case, as illustrated in FIG. 29B, the terminal 200 shifts PUCCH and PUSCH in the time direction for transmission compared to the case of FIG. 29A with the fifth symbol serving as the transmission start timing.

<4.3 Setting of Cross-TTI by PDCCH When PDCCH and PDSCH Are Shifted>

Figure 8A:
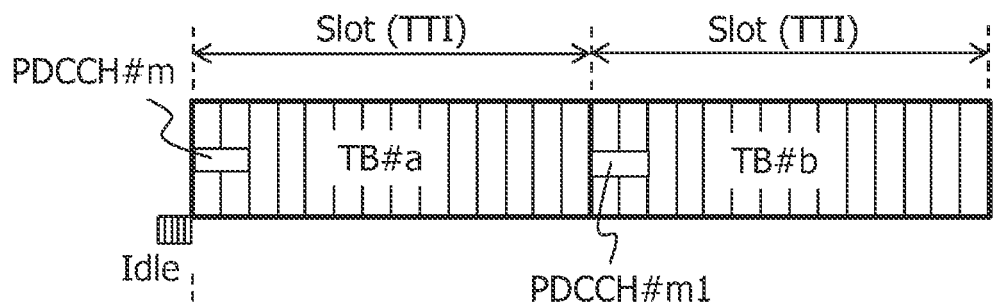
FIG. 8A and FIG. 8B depict diagrams illustrating an example of transmitting PDCCH and PDSCH.
Figure 8B:
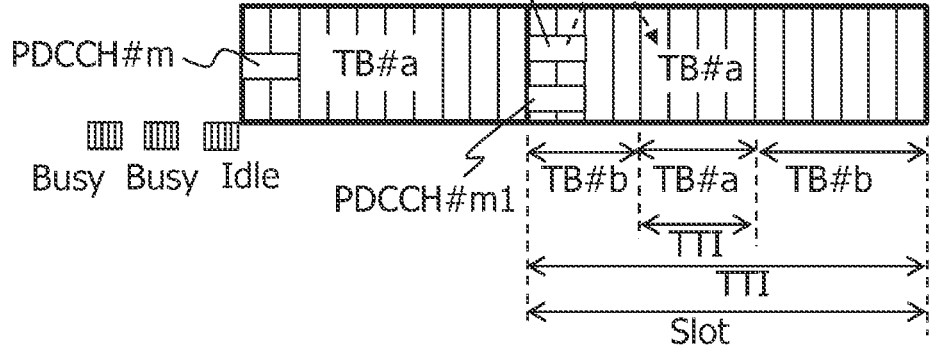

FIG. 8A and FIG. 8B depict diagrams illustrating examples of transmitting PDCCH and PDSCH.

In the example of FIG. 8A, the Unlicensed-band is in the "Idle" state at the time point of the first symbol of one slot, and thus the base station 100 transmits pieces of TB #a allocated to all the symbols of the head symbol in order. The base station 100 also transmits pieces of TB #b allocated to all the symbols in the next slot of the head slot in order.

Meanwhile, in the example of FIG. 8B, the "Busy" state is confirmed at the time points of the head symbol and third symbol of the head slot, and thus the base station 100 does not transmit TB #a. The "Idle" state is confirmed at the time point of the fifth symbol, and thus the base station 100 starts to transmit TB #a. In this case, the base station 100 has failed to transmit, in the head slot, the last 4 symbols of TB #a to be transmitted in the head slot. Thus, the base station 100 uses fifth to eighth symbols of the next slot (or TTI) by Cross-TTI to transmit data equivalent to the remaining 4 symbols of TB #a, which is "untransmitted".

In this example, Cross-TTI is set by PDCCH.

FIG. 9 depicts a diagram illustrating an example of a region (field) included in DCI to be transmitted by using PDCCH.

As illustrated in FIG. 9, DCI includes time domain resource assignment (TDRA), new data indicator (NDI), and hybrid automatic repeat request (HARQ) process number. Furthermore, new PDCCH includes redundancy version (RV), modulation and coding scheme (MCS), and frequency domain resource assignment (FDRA).

TDRA represents, for instance, specification of resources in the time direction, and includes the start symbol S and the length L in a slot. Like <4.1> given above, the start symbol S is defined to be a symbol at which a transmission burst has actually started to be transmitted, for instance. Further, when there are a plurality of transmission opportunities, the base station 100 sets the start symbol S and the length L to the same values.

FIG. 10A depicts a diagram illustrating an example of DCI included in PDCCH #m in the examples of FIG. 8A and FIG. 8B. As illustrated in FIG. 10A, the start symbol S and the length L included in PDCCH #m of FIG. 8A, and the start symbol S and the length L included in PDCCH #m of FIG. 8B are both set to S=0 and L=14.

Referring back to FIG. 9, NDI is used for identifying whether the data is retransmission data or new data through comparison with the previous NDI in a retransmission process (HARQ) with the same NDI as the current NDI, for instance.

Figure 11:
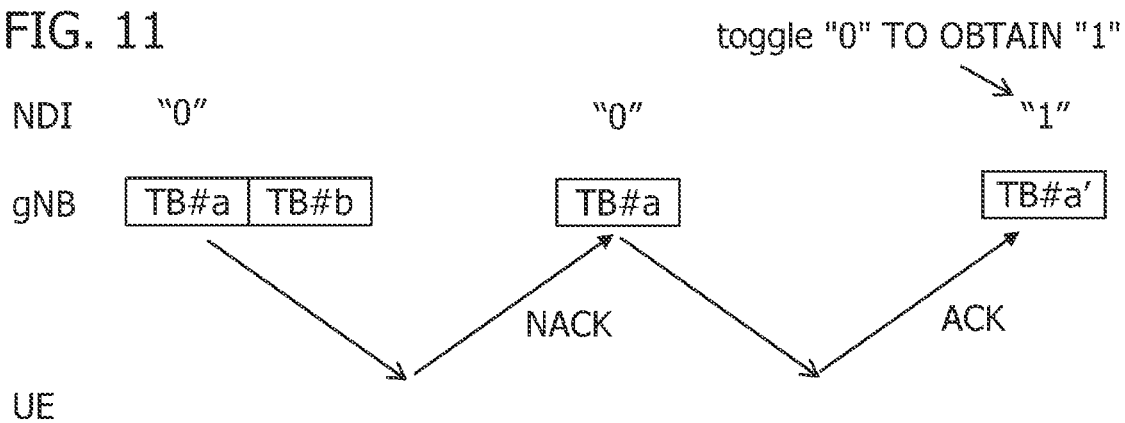
FIG. 11 depicts a diagram illustrating an example of NDI.

FIG. 11 depicts a diagram illustrating an example of using NDI.

Regarding TB #a the base station 100 first transmits "0" as NDI receives NACK from terminal 200 as a reply, and thus retransmits TB #a. In this case, the base station 100 does not toggle (or bit inversion) "0" represented as NDI, and transmits "0" as NDI again. The bit of NDI is not toggled, and thus the terminal 200 can recognize that the received TB #a is retransmission data.

Then, when the terminal 200 has received TB #a normally and returned ACK, the base station 100 transmits TB #a' different from TB #a as new data. In this case, the base station 100 toggles the bit "0" of NDI, and transmits "1". The terminal 200 has received "1" as NDI, and thus can recognize that TB #a' is new data.

Referring back to FIG. 9, the HARQ process number represents, for instance, the identification number of a buffer for each TB storing TB. For instance, when the HARQ process number is the same in the same retransmission process, the HARQ process number represents the same TB, whereas when the HARQ process number is different, the HARQ process number represents different TB.

RV represents, for instance, a version of coded data. It is possible to improve a coding gain on the reception side by changing the version of coded data for each retransmission. When the base station 100 transmits retransmission data in the same retransmission process, the base station 100 transmits RV different from the previously transmitted RV, to thereby enable the terminal 200 to improve the coding gain for the retransmission data.

In the first embodiment, new PDCCH (PDCCH #n in the example of FIG. 8B) is used for setting Cross-TTI, and NDI, HARQ process number, and RV are used to represent transmission of the "untransmitted" portion of PDSCH.

FIG. 10B depicts a diagram illustrating an example of DCI included in PDCCH #n, which is new PDCCH, in the example of FIG. 8B. In the example of FIG. 8B, the fourth symbol in the next slot of the head slot is set as the transmission start symbol and the length is set as 4 symbols for TB #a equivalent to remaining 4 symbols, and thus TDRA of PDCCH #n illustrated in FIG. 10B includes S=4 and L=4.

As illustrated in FIG. 10B, NDI included in PDCCH #n and NDI included in PDCCH #m illustrated in FIG. 10A both have "0". Furthermore, HARQ process number included in PDCCH #n and HARQ process number included in PDCCH #m both have "5".

As illustrated in FIG. 10A and FIG. 10B, HARQ process numbers of PDCCH #n and PDCCH #m are the same, which represents transmission of the same TB (TB #a) in the same retransmission process. Furthermore, although NDIs of PDCCH #n and PDCCH #m are the same. RVs of PDCCH #n and PDCCH #m are the same, which does not represent retransmission, for instance.

In other words, it is possible to represent transmission of the "untransmitted" portion of data of the same PDSCH by setting NDI, HARQ process number, and RV of PDCCH #n and PDCCH #m to the same values.

In the first embodiment, in this manner, it is possible to represent transmission of the "untransmitted" portion using DCI by changing the manner of usage without changing the definitions of NDI, HARQ process number, and RV.

In the examples of FIG. 8A and FIG. 8B, DCI of PDCCH #m1 indicating transmission of TB #b is represented in FIG. 10C, for instance. As illustrated in FIG. 10C, HARQ process number is different from that of PDCCH #m (FIG. 10A) transmitted in the head slot. This indicates that the base station 100 transmits TB (TB #b in FIG. 8A) different from TB (TB #a in FIG. 8A) transmitted in the head slot.

This concludes the description of three transmission examples.

<5. Others>

Next, description is given of other examples.

<5.1 Example of Notifying of Ending Symbol>

Next, description is given of an example of notifying of Ending Symbol.

Figure 12A:
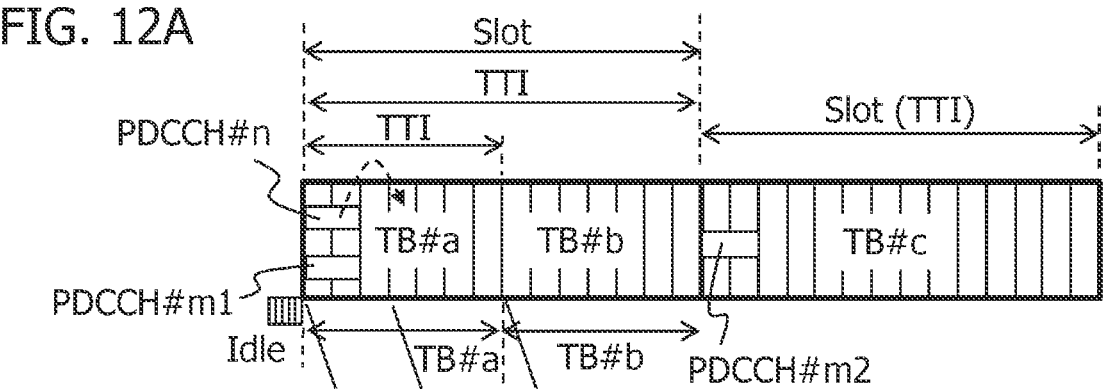
FIG. 12A, FIG. 12B and FIG. 12C depict diagrams illustrating an example of transmitting PDCCH and PDSCH.

FIG. 12A depicts a diagram illustrating an example of transmitting PDCCH and PDSCH.

FIG. 12A represents an example in which the head symbol of the head slot indicates the "Idle" state, and thus the first to fourth symbols are used to transmit TB #a, and fifth and subsequent symbols are used to transmit TB #b. FIG. 12A represents an example of a mini slot specified in 5G.

TDRA of PDCCH #n includes, for instance, the start symbol S=0 and the length L=7, and TDRA of PDCCH #m1 includes, for instance, the start symbol S=0 and the length L=14.

Figure 12B:
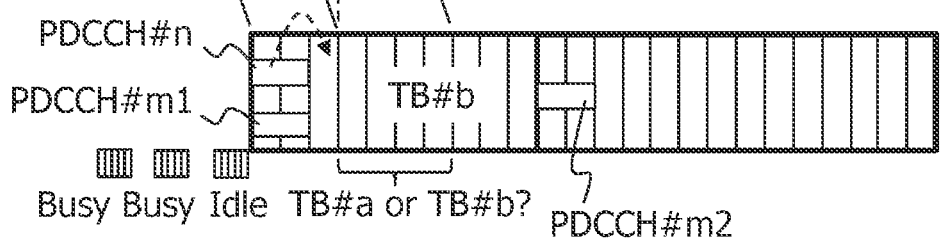

FIG. 12B represents an example in which Unlicensed-band is in the "Busy" state at the time points of the first symbol and third symbol of the head slot, and thus transmission is avoided and Unlicensed-band is in the "Idle" state at the time point of the fifth symbol. Thus, the base station 100 transmits PDCCH #n, PDCCH #n1, and TB #a with the fifth symbol serving as the transmission start timing.

In this case, data equivalent to 3 symbols, which is a part of TB #a allocated to first to seventh symbols of the head slot, is transmitted in the head slot. Thus, data equivalent to 4 symbols of TB #a, which is allocated to fourth to seventh symbols of TB #a, is not allowed to be transmitted by using fifth to seventh symbols of the head slot.

In such a case, it is not possible to grasp whether eighth to eleventh symbols of the head slot are used for transmitting data equivalent to 4 symbols of TB #a, which is an "untransmitted" portion or used for transmitting TB #b in accordance with an instruction issued by PDCCH #m1. Furthermore, PDCCH #n includes the start symbol S=0 and the length L=7, and PDCCH #m1 includes the start symbol S=0 and the length L=14, which means that the base station 100 and the terminal 200 fail to grasp what kind of processing is to be executed based only on the start symbol S and the length L.

In view of this, in the first embodiment, Ending Symbol is newly defined. Ending Symbol represents, for instance, an end symbol in the slot. The manner of counting Ending Symbol is, for instance, counting Ending Symbol in order from the head symbol by setting the head symbol of the slot as "0".

For instance, Ending Symbol=6 indicates that transmission of PDSCH is to be finished before the eighth symbol is reached through counting from the first symbol of the head of a slot. In the example of FIG. 12B, when TB #a includes Ending Symbol=6, transmission of data of TB #a is finished before the eighth symbol of the head slot is reached. Thus, in the example of FIG. 12B, eighth to fourteenth symbols are used for transmitting TB #b. Meanwhile, in the example of FIG. 12B, Ending Symbol=13 indicates that transmission of "untransmitted" data of TB #a is finished between the eighth and fourteenth symbols of the head slot. Thus, the example of FIG. 12B indicates that untransmitted data of TB #a is transmitted by using eighth to fourteenth symbols of the head slot. In the example of FIG. 12B, eighth to eleventh symbols are used to transmit the untransmitted data of TB #a.

Ending Symbol can be said to represent whether or not to shift the "untransmitted" portion of data to another TTI and transmit the data by setting "6" when S<6 is satisfied or "13" otherwise.

Ending Symbol may be set by an RRCReconfiguration message, or by PDCCH.

FIG. 13 represents an example of setting Ending Symbol by an RRC message.

As illustrated in FIG. 13, PDSCH-Config included in an RRCReconfiguration message newly includes IE of "Ending Symbol". The base station 100 inserts an end symbol into this IE for transmission to the terminal 200 (e.g., FIG. 5A).

The example illustrated in FIG. 13 represents an example of setting Ending Symbol=6 when the start symbol S<6 is satisfied, and setting Ending Symbol=13 otherwise. In other words, this means that, when the start symbol S is one of first to seventh symbols due to carrier sense, transmission of TB #a allocated to those symbols is finished before the eighth symbol is reached. Furthermore, this means that, when the start symbol S is one of eighth to fourteenth symbols due to carrier sense, transmission of TB #a is finished before the fifteenth symbol is reached.

FIG. 14 represents an example of setting Ending Symbol by PDCCH.

As illustrated in FIG. 14, a region of "Ending symbol" is newly included. The base station 100 inserts an end symbol into this region, and transmits PDCCH. In this case, the length L included in TDRA can be calculated as L=E−S+1, and thus TDRA maybe does not include the length L. The region of TDRA may include information of "Ending symbol".

Figure 12C:
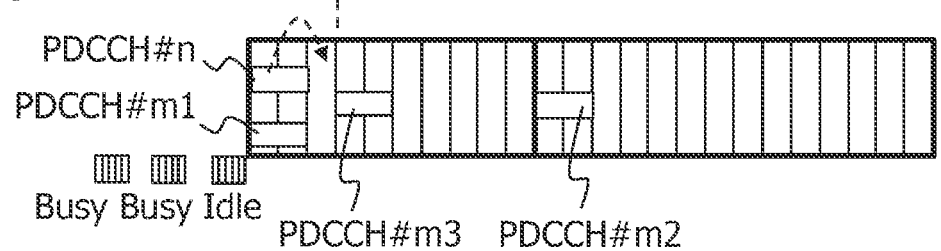

As illustrated in FIG. 12C, PDCCH may be allocated to eighth to tenth symbols of the head slot. In this case, the base station 100 may use this PDCCH to transmit DCI including information for determining whether "untransmitted" data of TB #a equivalent to 4 symbols is to be received by eighth to fourteenth symbols (or whether to allow shifting). Alternatively, the base station 100 may insert such information into PDSCH-Config for setting by an RRC message.

Ending symbol can also be used for transmitting PUCCH and PUSCH. In this case, the base station 100 can set Ending symbol by using PUSCH-Config illustrated in FIG. 13, for instance.

<5.2 Example in Which PDSCH is Not Allowed to be Mapped to Mapping Region of PDCCH>

5G enables transmission of PDCCH by using a symbol, and transmission of PDSCH by using the symbol, for instance. In other cases, 5G enables mapping of PDSCH to a symbol to which PDCCH is mapped and transmission thereof, for instance.

Figure 15A:
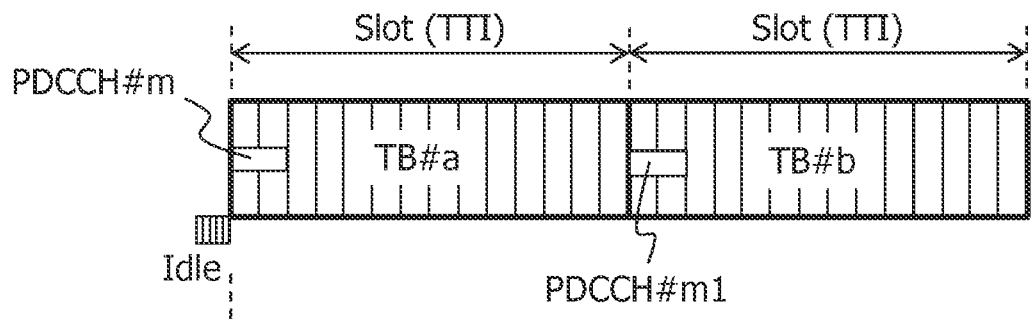
FIG. 15A and FIG. 15B depict diagrams illustrating an example of transmitting PDCCH and PDSCH.
Figure 15B:
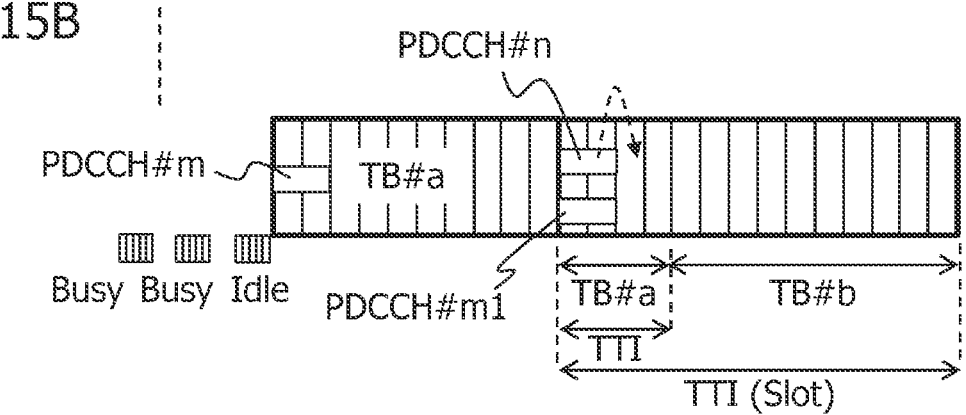

FIG. 15A and FIG. 15B represent an example of transmitting PDCCH and PDSCH.

FIG. 15A represents an example in which the base station 100 transmits PDCCH #m and TB #a in the head slot, and transmits PDCCH #m1 and TB #b in the next slot.

Meanwhile, FIG. 15B represents an example in which transmission is started from the fifth symbol in the head slot, and TB #a is transmitted by Cross-TTI using the head slot (or head TTI) and the next slot (or next TTI). In this case, the base station 100 allocates two PDCCH #m1 and PDCCH #n to first and second symbols of the next slot of the head slot, and additionally allocates PDSCH to these two symbols.

In this case, regarding regions of these two symbols, a radio resource region to which PDSCH is allocated may include a radio resource region to which PDCCH (PDCCH #m1 and PDCCH #n) is allocated.

In the first embodiment, the base station 100 punctures a coding bit to be mapped to the region of PDCCH in PDSCH including the region of PDCCH. In other words, when the region of PDSCH includes PDCCH, the base station 100 transmits PDCCH in preference to PDSCH. Furthermore, the base station 100 does not transmit (or puncture) a coding bit in a region of radio resources common to PDCCH and PDSCH. With this, for instance, the terminal 200 on the reception side can avoid using the same frequency to receive data and a control signal at the same timing, and can normally receive the data and control signal.

<6. Example of Configurations of Base Station and Terminal>

Figure 16A:
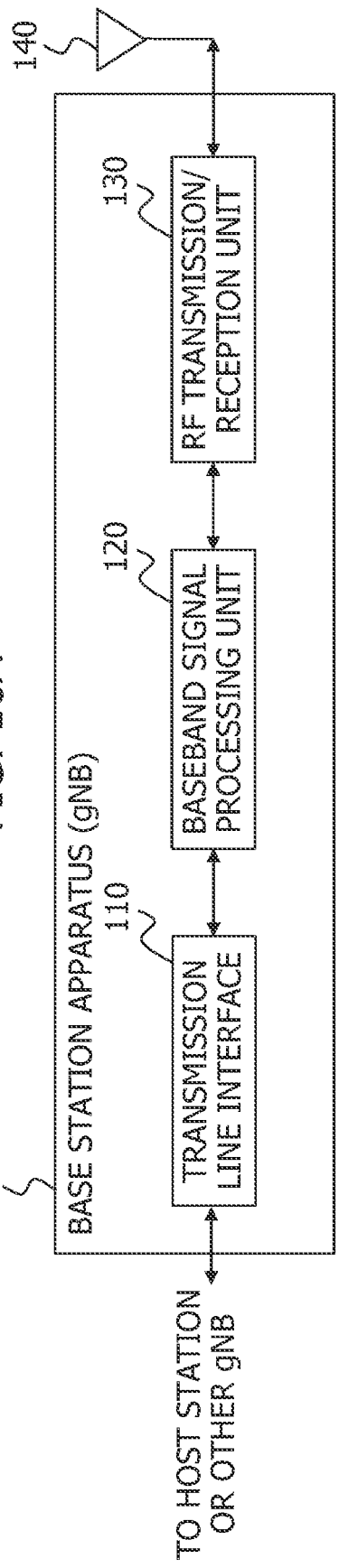
FIG. 16A depicts a diagram illustrating an example of a configuration of a base station and FIG. 16B depicts a diagram illustrating an example of a configuration of a baseband signal processing unit, respectively.

FIG. 16A depicts a diagram illustrating an example of a configuration of the base station 100. The base station 100 includes a transmission line interface 110, a baseband signal processing unit 120, a radio frequency (RF) transmission/reception unit (or transmission unit or reception unit) 130, and an antenna 140. The base station 100 may be a next generation node B (gNB) defined by 5G, for instance.

The transmission line interface 110 receives packet data transmitted from a host station or another base station, and extracts, for instance, data from the received packet data. The transmission line interface 110 outputs the extracted data to the baseband signal processing unit 120. Furthermore, the transmission line interface 110 receives input of, for instance, data output from the baseband signal processing unit 120, generates packet data including, for instance, the input data, and transmits the generated packet data to the host station or another base station.

The baseband signal processing unit 120 executes processing for data in the baseband, for instance.

Figure 16B:
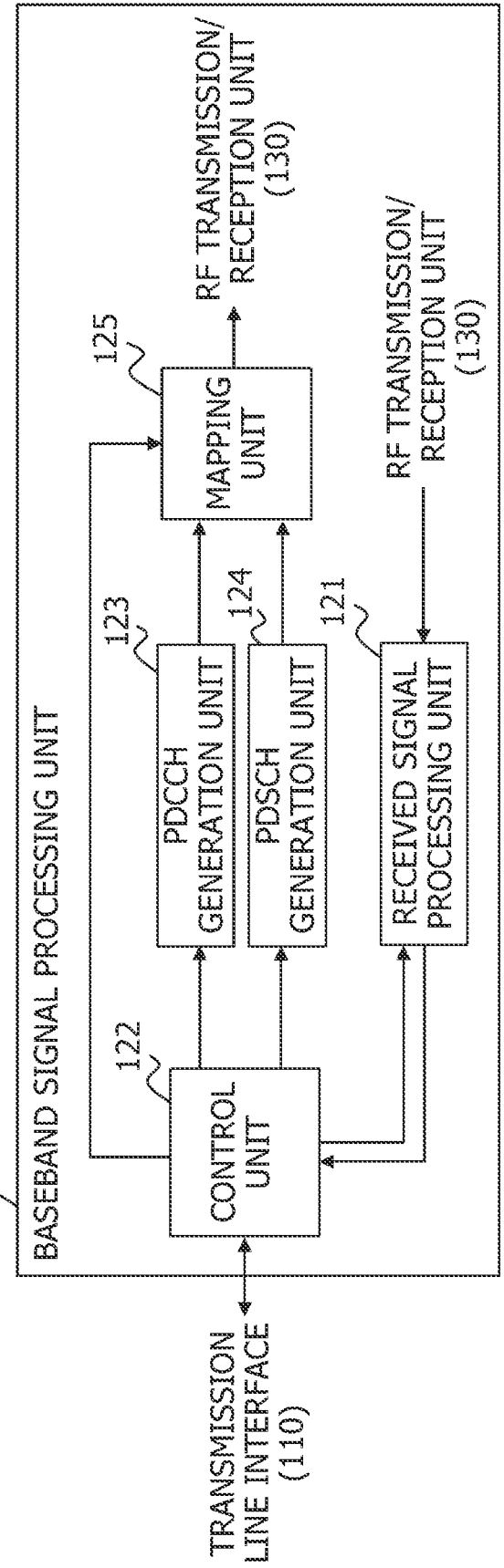

FIG. 16B depicts a diagram illustrating an example of a configuration of the baseband signal processing unit 120. The baseband signal processing unit 120 includes a received signal processing unit 121, a control unit (controller) 122, a PDCCH generation unit 123, a PDSCH generation unit 124, and a mapping unit 125.

The received signal processing unit 121 extracts, for instance, data (PUSCH) or a control signal (PUCCH) transmitted from a certain terminal 200 from a baseband signal output from the RF transmission/reception unit 130 in accordance with the result of scheduling in the uplink direction output from the control unit 122, for instance. The received signal processing unit 121 outputs, for instance, the extracted data or control signal to the control unit 122.

The control unit 122 executes, for instance, scheduling at the time of wirelessly communicating with the terminal 200, and outputs the result of scheduling to the PDCCH generation unit 123. In this case, the result of scheduling to be output to the PDCCH generation unit 123 includes the result of scheduling in each of the downlink direction and the uplink direction. The control unit 122 outputs the result of scheduling in the downlink direction to the mapping unit 125, and outputs the result of scheduling in the uplink direction to the received signal processing unit 121.

Furthermore, the control unit 122 outputs data output from the transmission line interface 110 to the PDSCH generation unit 124.

Furthermore, the control unit 122 generates an RRC message, and outputs the generated RRC message to the PDSCH generation unit 124. The RRC message includes, for instance, an RRCReconfiguration message, and also includes PDSCH-Config and PUSCH-Config illustrated in FIG. 6 or FIG. 13, for instance.

The PDCCH generation unit 123 generates, for the result of scheduling output from the control unit 122, DCI including this result of scheduling. The PDCCH generation unit 123 generates, for instance, DCI illustrated in FIG. 9 or FIG. 14. Information included in each IE of DCI may be generated by, for instance, the control unit 122, and in this case, the PDCCH generation unit 123 may generate DCI such that pieces of information are integrated to have one format of DCI illustrated in FIG. 9 or FIG. 14. The PDCCH generation unit 123 outputs the generated DCI to the mapping unit 125.

The PDSCH generation unit 124 outputs data, which is output from the control unit 122, to the mapping unit 125. In this case, for instance, the PDSCH generation unit 124 may output the data as PDSCH. Furthermore, the PDSCH generation unit 124 outputs an RRC message, which is output from the control unit 122, to the mapping unit 125.

The mapping unit 125 maps, to a predetermined region in radio resources, the control signal output from the PDCCH generation unit 123 and the data output from the PDSCH generation unit 124 in accordance with the result of scheduling in the downlink direction, which is output from the control unit 122. The mapping unit 125 outputs the mapped control signal and data to the RF transmission/reception unit 130.

Furthermore, the mapping unit 125 maps, for instance, the RRC message output from the PDSCH generation unit 124 to a predetermined region in radio resources, and outputs the mapped RRC message to the RF transmission/reception unit 130.

Referring back to FIG. 16A, the RF transmission/reception unit 130 subjects the control signal and data, which are output from the baseband signal processing unit 120, and the RRC message to frequency conversion to obtain a radio signal in a radio band, and outputs the radio signal after frequency conversion to the antenna 140.

Furthermore, the RF transmission/reception unit 130 subjects the radio signal output from the antenna 140 to frequency conversion to obtain a baseband signal in the baseband, and outputs the baseband signal after frequency conversion to the baseband signal processing unit 120.

The antenna 140 transmits the radio signal output from the RF transmission/reception unit 130 to the terminal 200. Furthermore, the antenna 140 receives the radio signal transmitted from the terminal 200, and outputs the received radio signal to the RF transmission/reception unit 130.

Figure 17A:
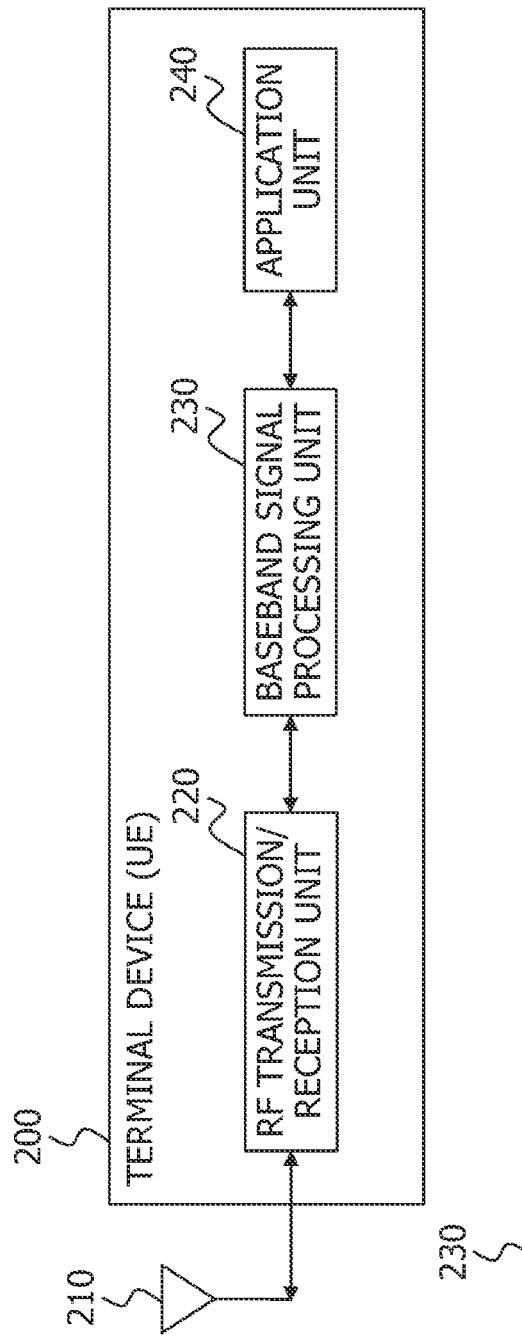
FIG. 17A depicts a diagram illustrating an example of a configuration of a terminal and FIG. 17B depicts a diagram illustrating an example of a configuration of a baseband signal processing unit, respectively.

FIG. 17A depicts a diagram illustrating an example of a configuration of the terminal 200.

The terminal 200 includes an antenna 210, a RF transmission/reception unit (or transmission unit or reception unit) 220, a baseband signal processing unit 230, and an application unit 240.

The antenna 210 receives a radio signal transmitted from the base station 100, and outputs the received radio signal to an RF transmission/reception unit 220. Furthermore, the antenna 210 transmits the radio signal output from the RF transmission/reception unit 220 to the base station 100.

The RF transmission/reception unit 220 subjects the radio signal output from the antenna 210 to frequency conversion to obtain a signal in the baseband, and outputs the baseband signal after conversion to the baseband signal processing unit 230. Furthermore, the RF transmission/reception unit 220 subjects the baseband signal output from the baseband signal processing unit 230 to frequency conversion to obtain a radio signal in the radio band, and outputs the radio signal after conversion to the antenna 210.

The baseband signal processing unit 230 executes processing for a baseband signal, for instance.

Figure 17B:
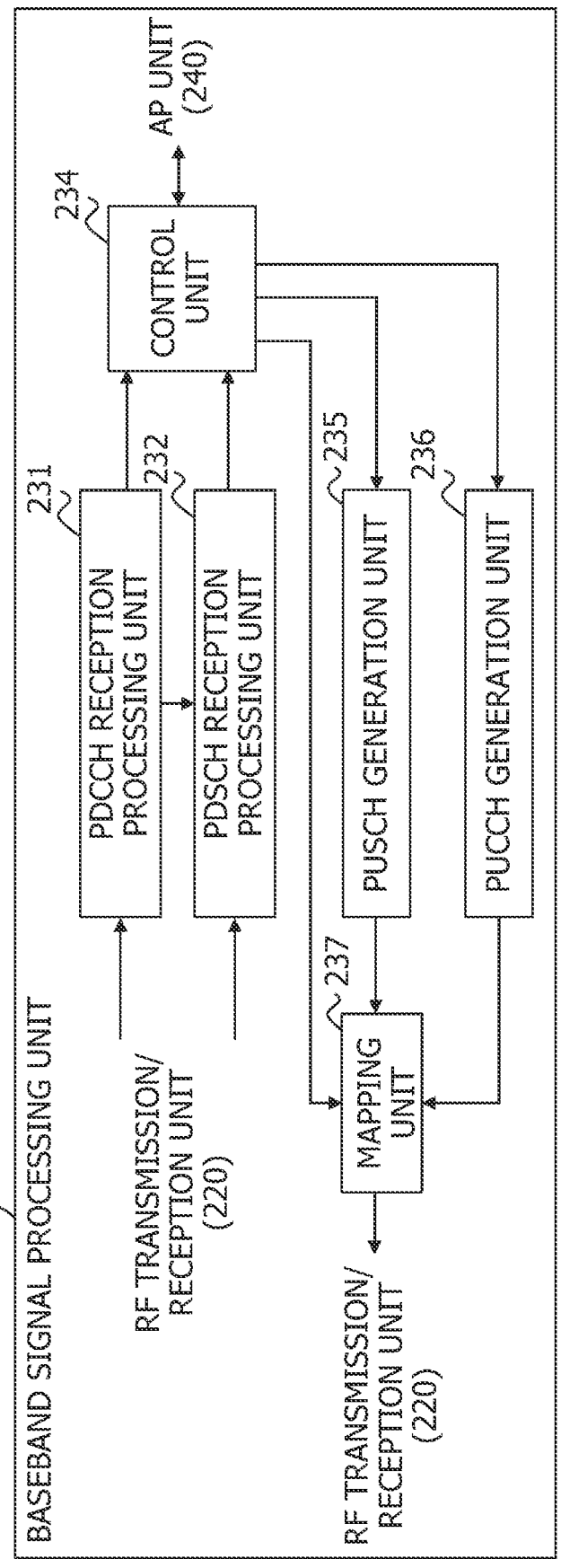

FIG. 17B depicts a diagram illustrating an example of a configuration of the baseband signal processing unit 230.

The baseband signal processing unit 230 includes a PDCCH reception processing unit 231, a PDSCH reception processing unit 232, a control unit (controller) 234, a PUSCH generation unit 235, a PUCCH generation unit 236, and a mapping unit 237.

The PDCCH reception processing unit 231 extracts a control signal from the baseband signal output from the RF transmission/reception unit 220. The PDCCH reception processing unit 231 outputs the result of scheduling in the downlink direction, which is included in the extracted control signal, to the PDSCH reception processing unit 232, and outputs the result of scheduling in the uplink direction to the control unit 234.

The PDSCH reception processing unit 232 extracts data or an RRC message, which is allocated to the own station, from the baseband signal output from the RF transmission/reception unit 220 in accordance with the result of scheduling in the downlink direction, which is output from the PDCCH reception processing unit 231.

At this time, the PDSCH reception processing unit 232 verifies whether data is received in accordance with the start symbol S and the length L included in DCI, or Ending Symbol instead of the length L, for instance. Furthermore, the PDSCH reception processing unit 232 verifies whether Cross-TTI is set by PDCCH based on NDI, HARQ process number, and RV (e.g., FIG. 9) included in DCI, for instance. In this case, when Cross-TTI is set by PDCCH, the PDSCH reception processing unit 232 extracts data to which Cross-TTI is set from the baseband signal based on, for instance, the start symbol S, the length L or Ending Symbol, NDI, HARQ process number, and RV. The PDSCH reception processing unit 232 may execute processing for Cross-TTI set by PDCCH instead of the control unit 234.

Furthermore, when Cross-TTI is set by an RRC message, for instance, the PDSCH reception processing unit 232 extracts a continuous portion of PDSCH from the baseband signal in accordance with PDSCH-Config (e.g., FIG. 6) included in the extracted RRC message.

The PDSCH reception processing unit 232 outputs the extracted data or the RRC message to the control unit 234.

The control unit 234 executes reception processing or transmission processing in accordance with the RRC message output from the PDSCH reception processing unit 232, for instance.

Furthermore, the control unit 234 outputs the data, which is output from the PDSCH reception processing unit 232, to the application unit 240.

Furthermore, the control unit 234 outputs the result of scheduling in the uplink direction, which is output from the PDCCH reception processing unit 231, to the mapping unit 737.

Furthermore, the control unit 234 outputs the data, which is output from the application unit 240, to the PUSCH generation unit 235. Furthermore, the control unit 234 generates a control signal in the uplink direction, and outputs the generated control signal to the PUCCH generation unit 236.

The PUSCH generation unit 235 outputs the data, which is output from the control unit 234, to the mapping unit 237.

The PUCCH generation unit 236 outputs the control signal, which is output from the control unit 234, to the mapping unit 237.

The mapping unit 237 maps the data and control signal to radio resources in accordance with the result of scheduling in the uplink direction, which is output from the control unit 234. The mapping unit 237 outputs the mapped data and control signal to the RF transmission/reception unit 220 as a baseband signal.

Referring back to FIG. 17A, the application unit 240 executes processing relating to an application for the data output from the baseband signal processing unit 230, for instance. Furthermore, the application unit 240 executes processing relating to an application to generate data, and outputs the generated data to the control unit 234, for instance.

<7. Operation Example>

Next, description is given of an operation example. As the operation example, description is first given of an operation example of <4.1> given above. Next, description is given of an operation example of <4.2> given above. Lastly, description is given of an operation example of <4.3>.

<7.1 Operation Example in Which Cross-TTI is Set by RRC Message When PDCCH and PDSCH Are Shifted>

FIG. 18 depicts a flow chart illustrating an example of operation in the base station 100, in which Cross-TTI is set by an RRC message when PDCCH and PDSCH are shifted.

It is assumed that the base station 100 and the terminal 200 finish exchanging an RRC message in accordance with a sequence illustrated in FIG. 5A, and the base station 100 and the terminal 200 hold PDSCH-Config illustrated in FIG. 6, for instance. For instance, the control unit 122 generates PDSCH-Config illustrated in FIG. 6, and transmits the generated PDSCH-Config to the terminal 200 via the PDSCH generation unit 124.

As illustrated in FIG. 18, when the base station 100 has started processing (S20), the base station 100 executes LBT (S21). For instance, the base station 100 executes the following processing.

Specifically, the received signal processing unit 121 measures the strength of a received signal in a predetermined frequency band of Unlicensed frequency band, and outputs the result to the control unit 122. The control unit 122 determines the "Idle" state when the result is less than a threshold value, or the control unit 122 determines the "Busy" state when the result is equal to or greater than the threshold value.

Next, the base station 100 determines whether the predetermined frequency band of Unlicensed frequency band is in the "Idle" state (S22). When the "Busy" state is determined (No in S22), the base station 100 executes LBT again after a predetermined period has elapsed (S21), and repeatedly executes this processing until the predetermined frequency band is in the "Idle" state (No in loop of S22).

When the predetermined frequency band is in the "Idle" state (Yes in S22), the base station 100 uses the predetermined frequency band to transmit PDCCH and PDSCH (S23). For instance, the base station 100 executes the following processing.

Specifically, when the control unit 122 has determined the "Idle" state, the control unit 122 instructs the mapping unit 125 to output a signal of the head slot (or head TTI). The control unit 122 issues an instruction to generate a signal of the heard slot before detecting data to be transmitted and starting LBT. First, the control unit 122 outputs data received from the transmission line interface 110 to the PDSCH generation unit 124. At this time, the control unit 122 executes scheduling to output the result to the PDCCH generation unit 123. The PDCCH generation unit 123 outputs DCI to the mapping unit 125, and the PDSCH generation unit 124 outputs data to the mapping unit 125. The mapping unit 125 maps the DCI and data to radio resources in accordance with the result of scheduling in the downlink direction. The mapping unit 125 transmits the mapped DCI and data to the terminal 200 via the RF transmission/reception unit 130.

For instance, as illustrated in FIG. 4B, when the "Idle" state is reached after the "Busy" state, the base station 100 shifts a symbol including PDCCH and PDSCH until the "Idle" state is reached. Furthermore, the base station 100 transmits a portion of PDSCH, which has failed to be transmitted in the head slot (or head TTI), in the next slot (or next TTI) by using Cross-TTI. For instance, the base station 100 executes the following processing.

Specifically, when the signal strength of the predetermined frequency band is equal to or greater than a threshold value, the control unit 122 instructs the mapping unit 125 not to transmit PDCCH and PDSCH, and the mapping unit 125 stops transmission of mapped PDCCH and PDSCH. During this period, the mapping unit 125 may store PDCCH and PDSCH into an internal memory. After that, when the sural strength is weaker than the threshold value, the control unit 122 verifies whether Unlicensed frequency band is not used by another device. Then, in this case, the control unit 122 shifts a symbol including PDCCH and PDSCH in the downlink direction in the time direction until the "Idle" state serving as the transmission start timing is reached. The control unit 122 also shifts subsequent PDCCH and PDSCH in the time direction. In the example of FIG. 4B, the control unit 122 executes shifting by 4 symbols. The control unit 122 outputs the result of shifting to the mapping unit 125. The mapping unit 125 reads the mapped PDCCH and PDSCH from the internal memory in accordance with the result of shifting, and outputs the result to the RF transmission/reception unit 130. After shifting, the mapping unit 125 or the RF transmission/reception unit 130 transmits a control signal and data to the terminal 200 by using PDCCH and PDSCH, respectively. Then, when the control unit 122 executes Cross-TTI in accordance with PDSCH-Config (e.g., FIG. 5A and FIG. 6), the control unit 122 outputs, to the mapping unit 125, for instance, the slot number of a slot in which an untransmitted part is to be transmitted or the symbol number of a symbol at which transmission is to be started. The mapping unit 125 reads an untransmitted portion of TB #a, which is stored in, for instance, the internal memory, in accordance with the instruction, and transmits the untransmitted portion at the symbol indicated by the slot in the instruction. In this manner, it is possible to implement Cross-TTI, for instance.

When the control unit 122 shifts PDCCH and PDSCH in the time direction, for instance, the control unit 122 sets the start symbol S and the length L included in PDCCH to the start symbol S and the length L included in PDCCH in the case where transmission is started from the head symbol in the slot, respectively.

Referring back to FIG. 18, when the base station 100 has finished transmission of PDCCH and PDSCH, the base station 100 finishes the processing (S24).

Figure 19:
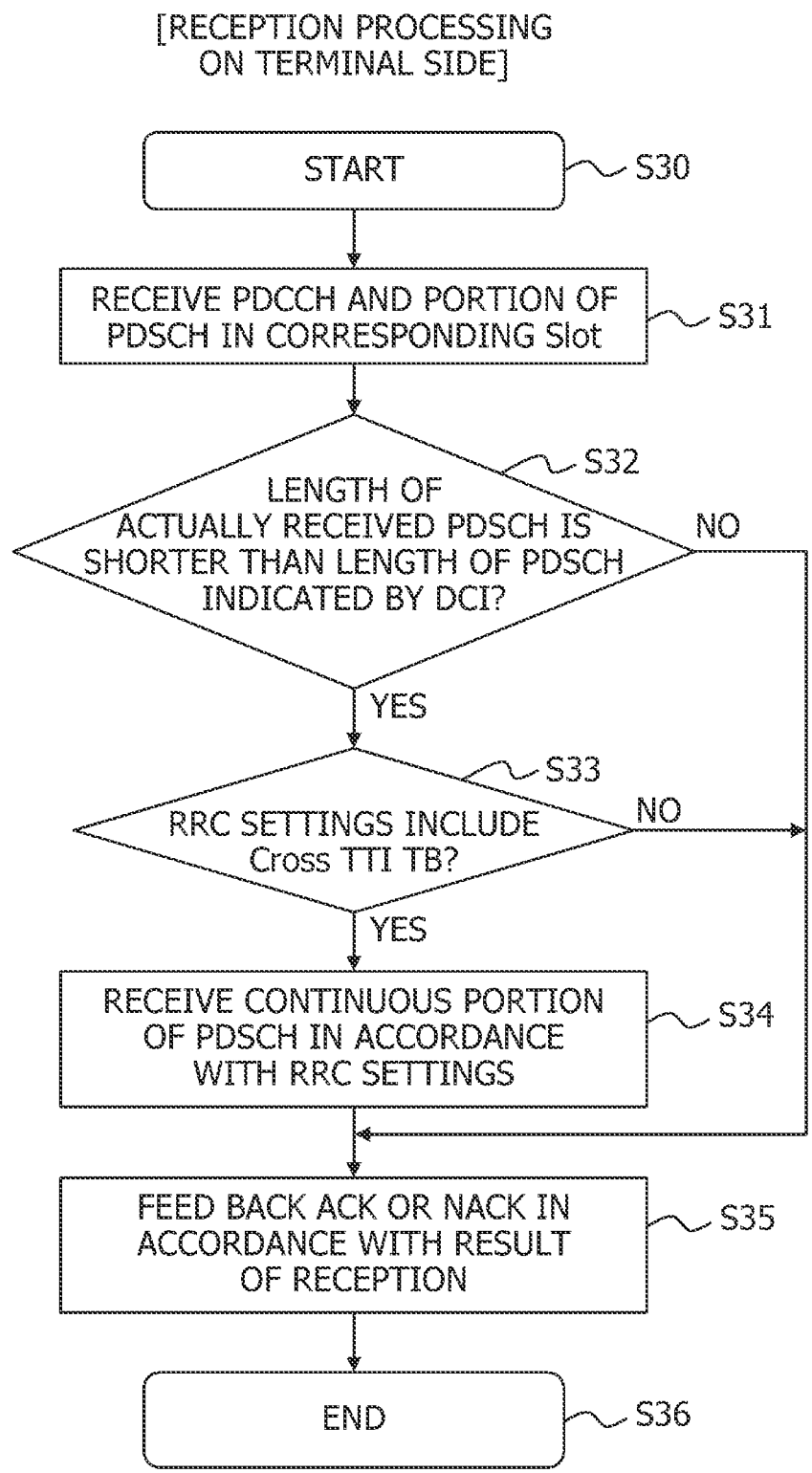
FIG. 19 depicts a flow chart illustrating an example of operation in a terminal.

FIG. 19 depicts a flow chart illustrating an example of processing on the side of the terminal 200 in this operation example.

When the terminal 200 has started processing (S30), the terminal 200 receives PDCCH and a portion of PDSCH in a slot including PDCCH (S31). For instance, the PDCCH reception processing unit 231 receives PDCCH, and the PDSCH reception processing unit 232 receives DCI from the PDCCH reception processing unit 231 to receive the portion of PDSCH in accordance with DCI.

Next, the terminal 200 determines whether the length of actually received PDSCH is Shorter than the length of PDSCH indicated by DCI (S32). As described above, DCI includes the start symbol S and the length L. For instance, the terminal 200 executes the following processing.

Specifically, the control unit 234 receives data output from the PDSCH reception processing unit 232, counts the amount of data, and calculates the length of PDSCH based on the counted amount of data. Then, the control unit 234 determines whether the calculated length is shorter than the length L indicated by DCI. The control unit 234 uses the DCI and the length of actually received PDSCH to verify whether the base station 100 has shifted data subsequent to PDCCH and PDSCH included in the head symbol and transmitted the data.

When the length of actually received PDSCH is shorter than the length of PDSCH indicated by DCI (Yes in S32), the terminal 200 determines whether Cross-TTI is set in an RRC message (S33). For instance, when the control unit 234 has determined that the calculated length is shorter than the length L indicated by DCI, the control unit 234 executes determination by verifying whether Cross-TTI is set (e.g., (1) of FIG. 6) in the RRC message received from the PDSCH reception processing unit 232.

When Cross-TTI is set (Yes in S33), the terminal 200 receives a continuous portion of PDSCH in accordance with the settings of RRC (S34). For instance, when the control unit 234 has confirmed the settings of Cross-TTI, the control unit 234 receives the continuous portion of PDSCH at the timing of, for instance, next TTI in accordance with IE included in PDSCH-Config (e.g., FIG. 6).

Next, the terminal 200 feeds back ACK or NACK in accordance with the result of reception (S35). For instance, when the control unit 234 has normally received PDSCH including the continuous portion of PDSCH by Cross-TTI, the control unit 234 generates ACK and feeds back ACK via the PUSCH generation unit 235 or the PUCCH generation unit 236. On the other hand, when the control unit 234 has not normally received PDSCH including the continuous portion of PDSCH by Cross-TTI, for instance, the control unit 234 generates NACK, and feeds back NACK via the PUSCH generation unit 235 or the PUCCH generation unit 236.

Then, the terminal 200 finishes a series of processing (S36).

On the other hand, Cross-TTI is not set in the settings of RRC (No in S33), the terminal 200 proceeds to S35 without executing the processing of Cross-TTI. In this case, the terminal 200 feeds back ACK or NACK for received PDSCH without executing Cross-TTI.

On the other hand, when the length of actually received PDSCH is equal to the length of PDSCH indicated by DCI (No in S32), the terminal 200 transitions to S35. In this case, the terminal 200 has received PDSCH with the length L indicated by DCI, and for instance, the same situation as that of FIG. 4A is reached, and thus the terminal 200 feeds back ACK or NACK for received PDSCH without executing the processing of Cross-TTI.

<7.2 Operation Example in Which Cross-TTI is Set by RRC Message When PUSCH is Shifted>

Figure 20:
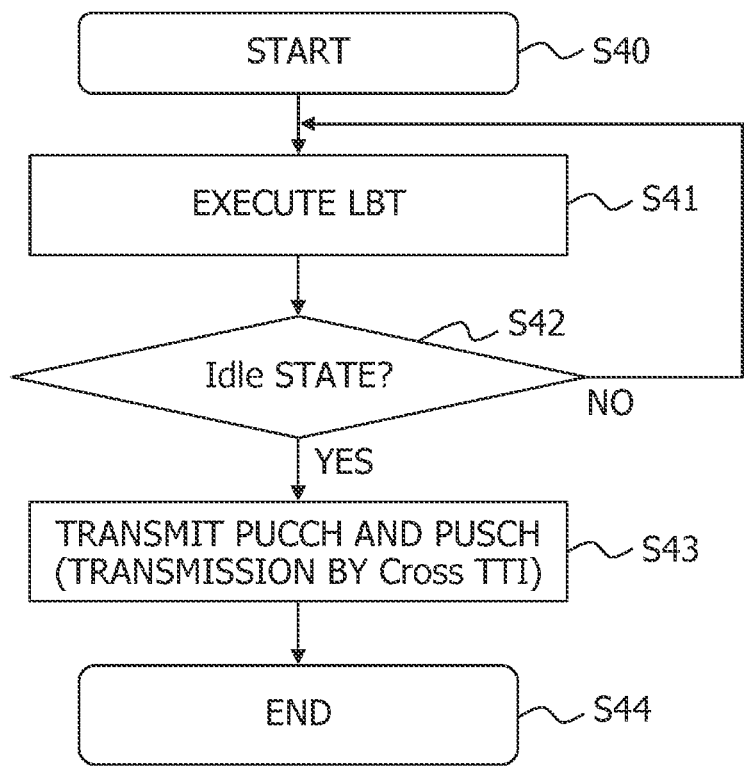
FIG. 20 depicts a flow chart illustrating an example of operation in a terminal.

FIG. 20 depicts a flow chart illustrating an example of operation on the side of the terminal 200, in which Cross-TTI is set by an RRC message when PUSCH is shifted. Also in this case, like <7.1> given above, it is assumed that the base station 100 and the terminal 200 finish exchanging an RRC message (e.g., FIG. 5A), and the base station 100 and the terminal 200 mutually hold PUSCH-Config (e.g., FIG. 6). For instance, the control unit 122 generates PUSCH-Config illustrated in FIG. 6, and transmits PUSCH-Config to the terminal 200 via the PDSCH generation unit 124, for instance.

When the terminal 200 has started processing (S40), the terminal 200 executes LBT (S41). For instance, the terminal 200 executes the following processing.

Specifically, the PDCCH reception processing unit 231 or the PDSCH reception processing unit 232 measures the signal strength of a received signal in a predetermined frequency band of Unlicensed frequency band, and outputs the result to the control unit 234. Like the control unit 122 of the base station 100, the control unit 234 determines the "Idle" state or the "Busy" state based on the result.

When the predetermined frequency band is in the "Busy" state (No in S42), the terminal 200 executes LBT again after a predetermined period has elapsed (S41), and repeatedly executes this processing until the predetermined frequency band is in the "Idle" state (No in loop of S42).

When the predetermined frequency band is in the "Idle" state (Yes in S42), the terminal 200 uses the predetermined frequency band to transmit PUCCH and PUSCH to the base station 100 (S43). For instance, the terminal 200 executes the following processing.

Specifically, when the control unit 234 has determined the "Idle" state, the control unit 234 outputs data received from the application unit 240 to the mapping unit 237 via the PUSCH generation unit 235. The control unit 234 outputs the result of scheduling in the uplink direction, which is received from the PDSCH reception processing unit 232, to the mapping unit 237. Furthermore, the control unit 234 generates a control signal, and outputs the control signal to the mapping unit 237 via the PUCCH generation unit 236. The mapping unit 237 maps a control signal and data to radio resources in accordance with the result of scheduling in the uplink direction. The mapping unit 237 transmits the mapped control signal (PUCCH) and data (PUSCH) to the base station 100 via the RF transmission/reception unit 220.

For instance, as illustrated in FIG. 7B, when the "Idle" state is reached after the "Busy" state, the terminal 200 shifts a symbol including PUCCH and PUSCH until the "Idle" state is reached. Furthermore, the terminal 200 transmits a portion of PUSCH, which has failed to be transmitted in the head slot (or head TTI), in the next slot (or next TTI) by using Cross-TTI. For instance, the terminal 200 executes the following processing.

Specifically, when the signal strength of the predetermined frequency band is equal to or greater than a threshold value, the control unit 234 instructs the mapping unit 237 not to transmit PUCCH and PUSCH, and the mapping unit 237 stops transmission of mapped PUCCH and PUSCH. In this case, the mapping unit 237 may store PUCCH and PUSCH into an internal memory. After that, when the signal strength is weaker than the threshold value, the control unit 234 verifies whether Unlicensed frequency baud is not used by another device. Then, the control unit 234 shifts a symbol including PUCCH and PUSCH in the uplink direction in the time direction until the "Idle" state serving as the transmission start timing is reached. The control unit 234 also shifts subsequent PUCCH and PUSCH in the time direction. In the example of FIG. 7B, the control unit 234 executes shifting by 4 symbols. The control unit 234 outputs the result of shifting to the mapping unit 237. The mapping unit 237 reads PUCCH and PUSCH from the internal memory in accordance with the result of shifting, and outputs the result to the RF transmission/reception unit 220. The mapping unit 237 or the RF transmission/reception unit 220 transmits a control signal and data allocated to a symbol after shifting to the base station 100 by using PUCCH and PUSCH respectively. Then, when the control unit 234 executes Cross-TTI in accordance with PUSCH-Config (e.g., FIG. 5A and FIG. 6), the control unit 234 outputs, to the mapping unit 237, for instance, the slot number of a slot in which an untransmitted part is to be transmitted or the symbol number of a symbol at which transmission is to be started. The mapping unit 237 reads an untransmitted portion (e.g., TB #a of FIG. 7A), which is stored in, for instance, the internal memory, in accordance with the instruction, and transmits the untransmitted portion at the symbol indicated by the slot in the instruction. In this manner, it is possible to implement Cross-TTI in the uplink direction, for instance.

Referring back to FIG. 20, when the terminal 200 has finished transmission of PUCCH and PUSCH, the terminal 200 finishes the processing (S44).

When the terminal 200 does not transmit PUCCH (e.g., FIG. 7B), the processing of S43 is processing of transmitting PUSCH without transmitting PUCCH.

Figure 21:
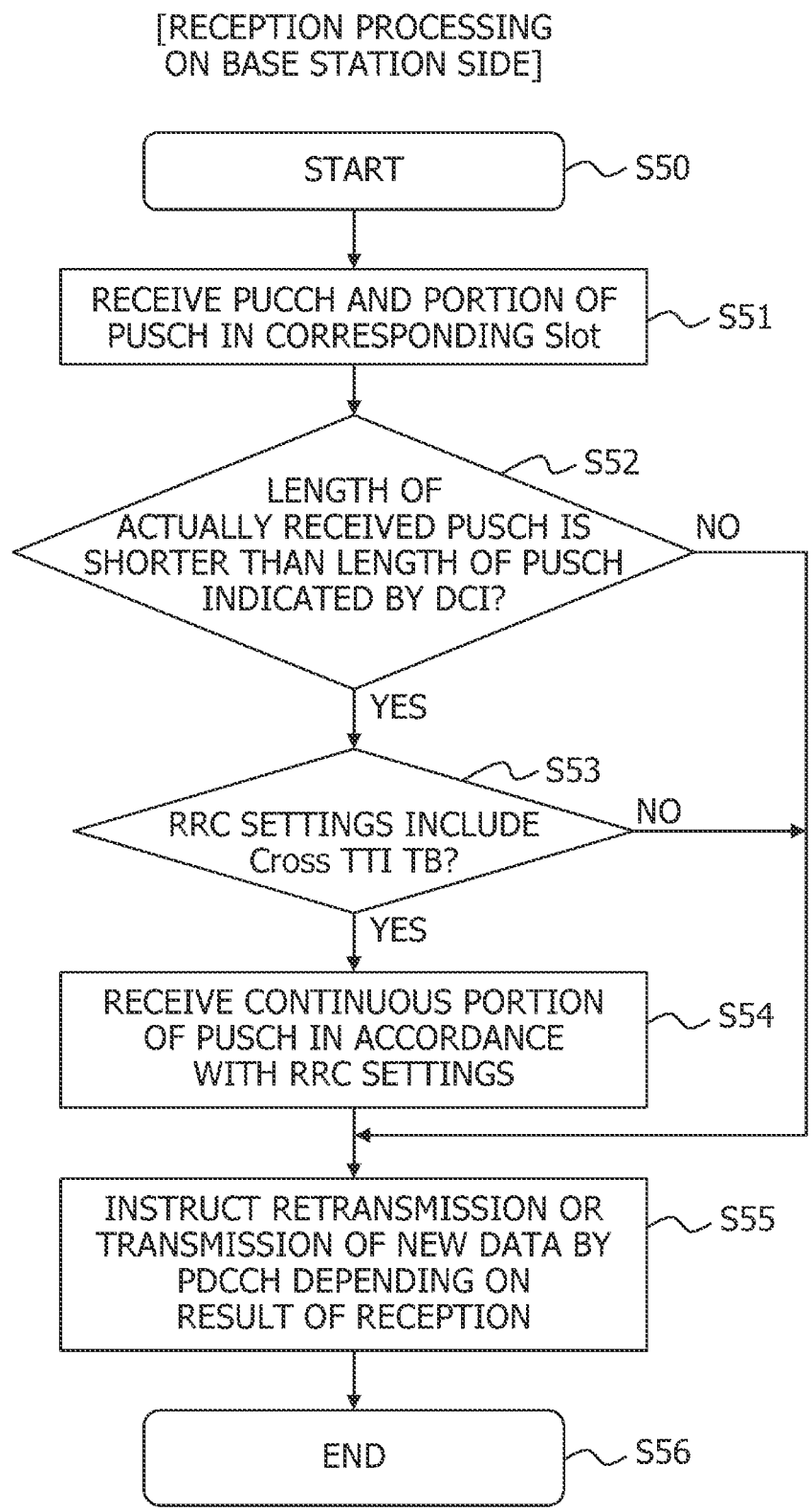
FIG. 21 depicts a flow chart illustrating an example of operation in a base station.

FIG. 21 depicts a flow chart illustrating an example of processing on the side of the base station 100 in this operation example.

When the base station 100 has started processing (S50), the base station 100 receives PUCCH and a portion of PUSCH in a slot including PUCCH (S51). For instance, the received signal processing unit 121 extracts PUCCH and PUSCH, which are transmitted from the terminal 200, from a baseband signal in accordance with the result of scheduling in the uplink direction, winch is output from the control unit 122, and outputs the extracted PUCCH and PUSCH to the control unit 122.

Next, the base station 100 determines whether the length of actually received PUSCH is shorter than the length of PUSCH indicated by DCI (S52). For instance, the base station 100 executes the following processing.

Specifically, the control unit 122 counts the amount of data received from the received signal processing unit 121, and calculates the length of PUSCH based on the counted amount of data. The control unit 122 determines whether PUSCH is started from the start symbol S and the calculated length is shorter than the length L based on the start symbol S and the length L included in DCI. Like the control unit 122 of the terminal 200, the control unit 122 also uses the DCI and the length of actually received PUSCH to verify whether the terminal 200 has shifted data subsequent to PUCCH and PDSCH included in the head symbol and transmitted the data.

When the length of actually received PUSCH is shorter than the length of PUSCH indicated by DCI (Yes in S52), the base station 100 determines whether Cross-TTI is set in an RRC message (S53). For instance, the control unit 122 executes determination by verifying whether Cross-TTI is set (e.g., (1) of FIG. 6) in the RRC message generated by itself.

When Cross-TTI is set (Yes in S53), the base station 100 receives a continuous portion of PUSCH in accordance with the settings of RRC (S54). For instance, when the control unit 122 has confirmed the settings of Cross-TTI, the control unit 122 receives the continuous portion of PUSCH at the timing of, for instance, next TTI in accordance with IE included in PUSCH-Config (e.g., FIG. 6).

Next, the base station 100 instructs retransmission or transmission of new data by PDCCH depending on the result of reception (S55). For instance, when the control unit 122 has normally received PUSCH including the continuous portion of PUSCH by Cross-TTI, the control unit 122 transmits PDCCH issuing an instruction to transmit new data to the terminal 200 via the PDCCH generation unit 123. On the other hand, when the control unit 122 has not normally received PUSCH including the continuous portion of PUSCH by Cross-TTI, for instance, the control unit 122 transmits PDCCH issuing an instruction for retransmission to the terminal 200 via the PDCCH generation unit 123.

Then, the base station 100 finishes a series of processing (S56).

On the other hand, Cross-TTI is not set in the settings of RRC (No in S53), the base station 100 transitions to S55 without executing the processing of Cross-TTI. In this case, the terminal 200 feeds back ACK or NACK for received PUSCU without executing Cross-TTI.

On the other hand, when the length of actually received PUSCH is equal to the length of PUSCH indicated by DCI (No in S52), the base station 100 transitions to S55. In this case, the base station 100 has received PUSCH with the length L indicated by DCI, and for instance, the same situation as that of FIG. 7A is reached, and thus the base station 100 feeds back ACK or NACK for received PUSCH without executing the processing of Cross-TTI.

In FIG. 21, when the terminal 200 does not transmit PUCCH, in the processing of S51, the base station 100 receives PUSCH without receiving PUCCH.

<7.3 Operation Example in Which Cross-TTI is Set by PDCCH When PDCCH and PDSCH Are Shifted>

Figure 22:
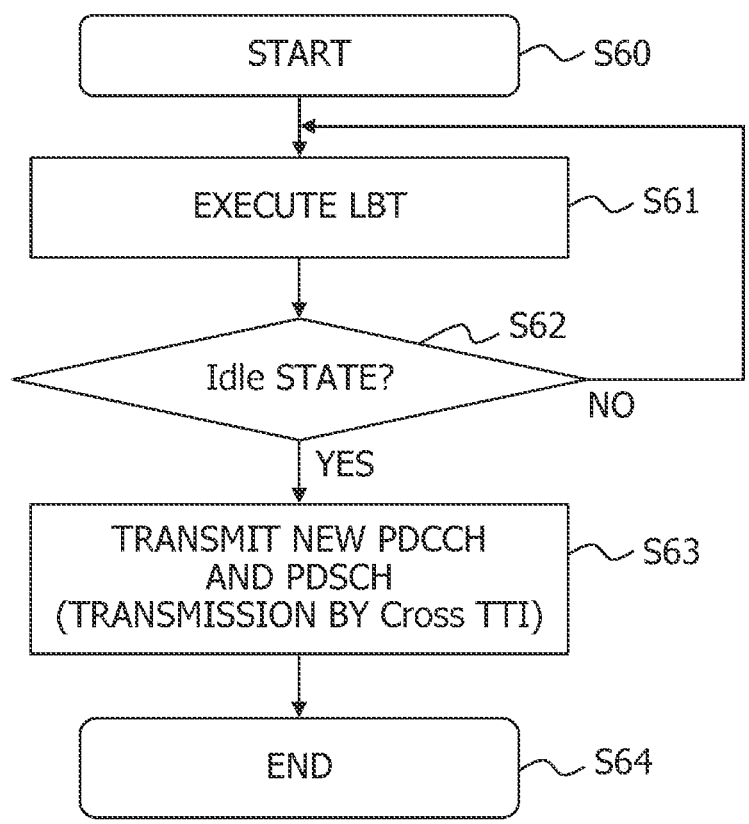
FIG. 22 depicts a flow chart illustrating an example of operation in a base station.

FIG. 22 depicts a flow chart illustrating an example of operation on the side of the base station 100, in which Cross-TTI is set by PDCCH when PDCCH and PDSCH are shifted.

At the time of execution of this operation example, it is assumed that the base station 100 and the terminal 200 finish exchanging an RRC message (e.g., FIG. 5A), and the base station 100 and the terminal 200 mutually hold PDSCH-Config in a memory, for instance. However, it is assumed that (1) of FIG. 6 is set in PDSCH-Config, and (2) to (4) are not set in PDSCH-Config. In other words, it is assumed that the base station 100 and the terminal 200 share the determination of whether to execute Cross-TTI through exchange of an RRC message, and details of Cross-TTI are set by PDCCH.

In the processing illustrated in FIG. 22, S60 to S62 are identical to S20 to S22 illustrated in FIG. 18 of <7.1> given above.

When Unlicensed frequency band is in the "Idle" state (Yes in S62), the base station 100 transmits PDCCH and PDSCH (S23). Like the case of <7.1> given above, when PDCCH and PDSCH are shifted in the head slot, the base station 100 executes the following processing, for instance.

Specifically, at the time of executing scheduling of the head slot, the control unit 122 determines, for instance, TDRA, NDI, HARQ process number, RV, and MCS illustrated in FIG. 9, and outputs the determined pieces of information to the PDCCH generation unit 123. The PDCCH generation unit 123 integrates those pieces of information to generate PDCCH #m illustrated in FIG. 10A, for instance. The PDCCH generation unit 123 transmits the generated PDCCH #m to the terminal 200 via the mapping unit 125. Furthermore, the control unit 122 generates new PDCCH (PDCCH #n in the example of FIG. 10A) in order to set Cross-TTI for PDSCH, which has failed to be transmitted in the head slot because the symbol including PDCCH (PDCCH #m in the example of FIG. 10A) and PDSCH has been shifted in the head slot. The control unit 122 generates the same NDI, HARQ process number, and RV as NDI, HARQ process number, and RV included in PDCCH (PDCCH #m) of the head slot. The PDCCH generation unit 123 generates PDCCH (PDCCH #n) for setting Cross-TTI including those pieces of information, and transmits PDCCH to the terminal 200 via the mapping unit 125, for instance. PDCCH #m1 may be generated when PDCCH #m is generated. Furthermore, transmission of PDSCH by Cross-TTI is identical to that of <7.1> given above.

Figure 23:
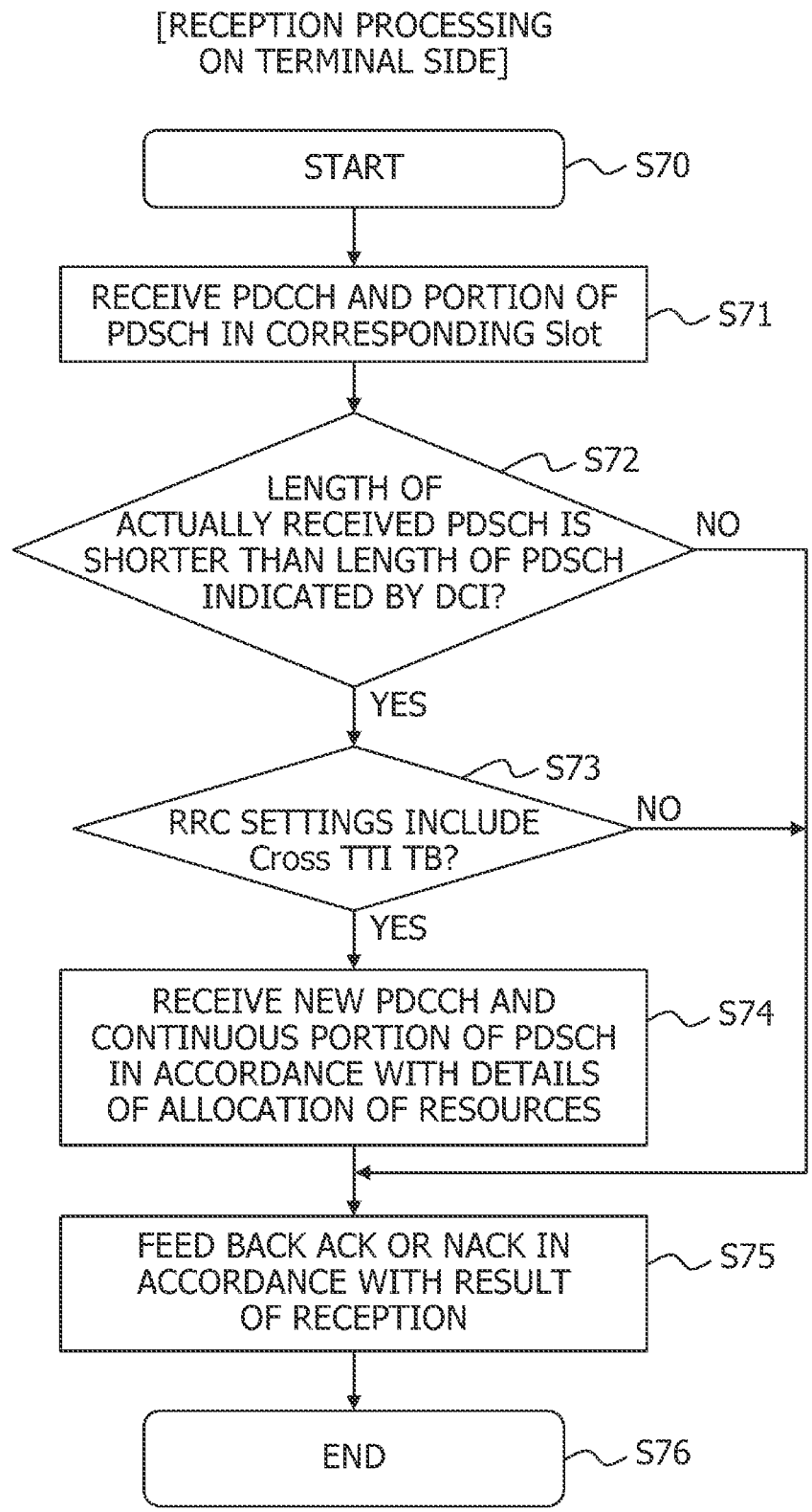
FIG. 23 depicts a flow chart illustrating an example of operation in a terminal.

FIG. 23 depicts a flow chart illustrating an example of operation on the side of the terminal 200, in which Cross-TTI is set by PDCCH when PDCCH and PDSCH are shifted.

In FIG. 23, S70 to S72 are the same as S30 to S32 of FIG. 19 of <7.1> given above. However, in S72, DCI, which is used for determining whether the length of actually received PDSCH is shorter than the length of PDSCH indicated by DCI, is DCI included in PDCCH of the head slot, for instance. In the example of FIG. 8B, this DCI corresponds to DCI included in PDCCH #m.

When the length of actually received PDSCH is shorter than the length of PDSCH indicated by DCI (Yes in S72), the terminal 200 determines whether Cross-TTI is set in the settings of RRC (S73). For instance, the terminal 200 executes the following processing.

Specifically, the control unit 234 calculates the length of data based on the amount of data output from the PDSCH reception processing unit 232, and determines that the length is Shorter than the length L indicated by DCI. Then, the control unit 234 determines whether Cross-TTI is set by verifying the settings of Cross-TTI ((1) of FIG. 6) in PDSCH-Config included in the RRC message output from the PDSCH reception processing unit 232.

When Cross-TTI is set (Yes in S73), the terminal 200 receives new PDCCH, and receives a continuous portion of PDSCH in accordance with details of allocation of resources (S74). For instance, the terminal 200 executes the following processing.

Specifically, the PDSCH reception processing unit 232 receives new PDCCH from the PDCCH reception processing unit 231, and refers to each field illustrated in FIG. 9. Then, the PDSCH reception processing unit 232 verifies an "untransmitted" portion of PDSCH addressed to the own station in accordance with information indicated by each field, and receives a portion of PDSCH subsequent to PDSCH allocated by PDCCH of previous TTI.

Next, the terminal 200 feeds back ACK or NACK in accordance with the result of reception (S75). For instance, the control unit 234 determines whether data received from the PDSCH reception processing unit 232 is normal, generates ACK or NACK in accordance with the result of determination, and feeds back ACK or NACK to the base station 100 via the PUSCH generation unit 235 or the PUCCH generation unit 236.

Then, the terminal 200 finishes a series of processing (S76).

On the other hand, when the length of actually received PDSCH is equal to the length of PDSCH indicated by DCI (No in S72), or Cross-TTI is set not to be executed in the settings of RRC (No in S73), the terminal 200 transitions to S75 to execute the above-mentioned processing.

<8. Search Space>

Now, supplementary description is given of the first embodiment.

5G includes ControlResourceSet (CORESET) as an RRC message. CORESET is used for setting time and frequency control resources and searching DCI, for instance. IE included in CORESET includes frequencyDomainResources. frequencyDomainResources represents frequency resources for searching DCI, for instance.

Furthermore, 5G includes SearchSpace as an RRC message. SearchSpace represents how a PDCCH candidate is searched for or where a PDCCH candidate is searched for, for instance. CORESET and SearchSpace are each an information element or a message included in an RRCReconfiguration message, for instance.

Figure 24A:
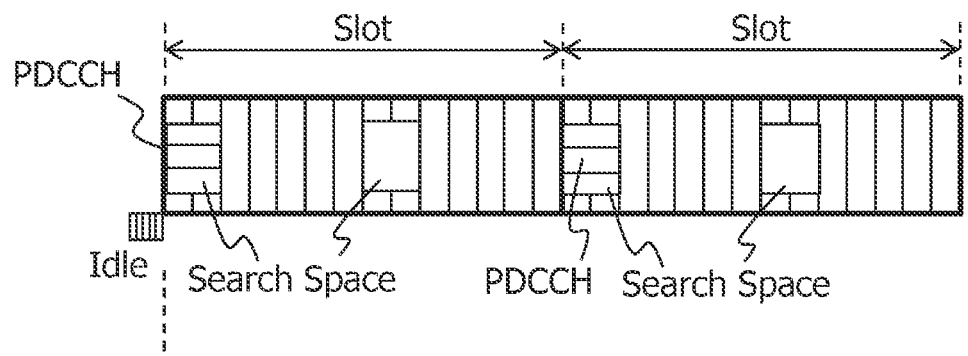
FIG. 24A and FIG. 24B depict diagrams illustrating an example of transmitting PDCCH and PDSCH.

FIG. 24A depicts a diagram illustrating an example of transmission of PDCCH and PDSCH including a search space, for instance. The search space includes one or a plurality of PDCCHs. For instance, the terminal 200 searches a region to which PDCCH is allocated to on radio resources in accordance with SearchSpace being an RRC message. Some PDCCHs give notifications to individual terminals 200. Some PDCCHs give notifications to a system in common or a plurality of terminals. For instance, the terminal 200 also searches PDCCH for transmitting information common to the system, e.g., information on a format, e.g., as the length of a transmission burst or the length of a next slot, information on an uplink transmission section, or the slot number of a slot at which the PDCCH is positioned in the transmission burst (e.g., the number is counted with the head slot serving as 0).

SearchSpace includes each IE of monitoringSlotPeriodicityAndOffset, monitoringSymbolsWithinSlot, and duration.

monitoringSlotPeriodicityAndOffset is, for instance, IE representing how many slots include one search space. For instance, when monitoringSlotPeriodicityAndOffset is "all slots", all the slots include a search space.

monitoringSymbolsWithinSlot is, for instance, IE representing symbols at which PDCCH may be transmitted in a slot (or at which PDCCH can be transmitted). monitoringSymbolsWithinSlot is defined by, for instance, an absolute position in a slot. For instance, when monitoringSymbolsWithinSlot is "10000001000000", as illustrated in FIG. 24A, this indicates that PDCCH is allocated to the first symbol and eighth symbol in a slot.

duration is, for instance, IE representing the length in the time direction. For instance, when duration is "2", as illustrated in FIG. 24A, this indicates that PDCCH has the length of "2" symbols.

Resources of PDCCH for the region of the search space in the time direction can be specified by, for instance, each IE of monitoringSlotPeriodicityAndOffset, monitoringSymbolsWithinSlot, and duration. Then, the terminal 200, which has received such an RRC message, can receive PDCCH by monitoring a region on radio resources according to those IEs.

Figure 24B:
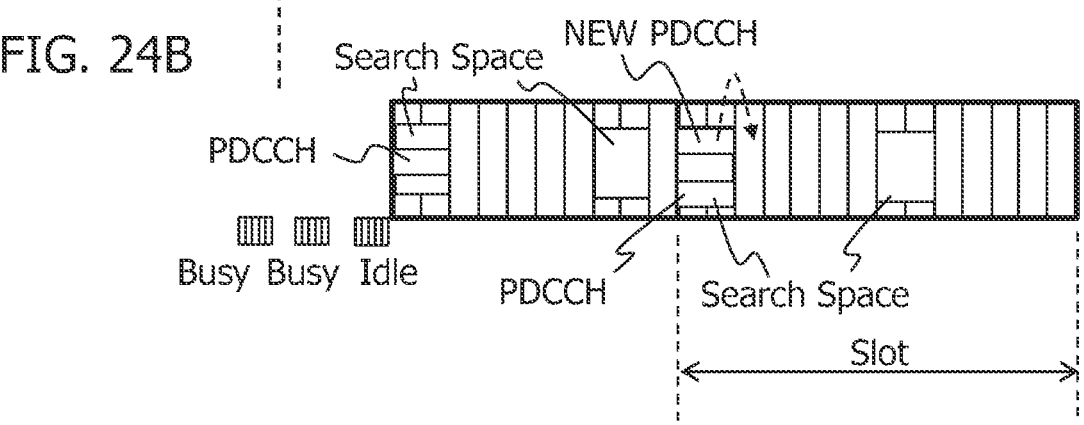

In the first embodiment, for instance, as illustrated in FIG. 24B, a symbol including PDCCH and PDSCH can be shifted in the time direction due to the result of carrier sense, which produces a plurality of transmission opportunities. In this case, how the resources for the search space in the time direction are defined becomes an issue. In particular, monitoringSymbolsWithinSlot defines a symbol by an absolute position in a slot, for instance, and thus how to handle this definition becomes an issue.

When a subsequent slot other than the head slot of FIG. 24B is focused, the position of the search space is the same as the position of the search space in Licensed frequency band. Thus, the search space in the subsequent slot of Unlicensed frequency band and the search space in Licensed frequency band can be monitored in common. Meanwhile, a method of monitoring the search space of the head slot is different from a method of monitoring the search space in Licensed frequency band.

In view of this, in the first embodiment, the method of monitoring the search space is defined by two options. The first option (Option 1) defines two monitoringSymbolsWithinSlots by the subsequent slots and the head slot. The second option (Option 2) is a method of defining monitoringSymbolsWithinSlot to be the same for the subsequent slots and the head slot, and changing interpretation and processing by the terminal 200.

FIG. 25 depicts a diagram illustrating an example of defining two options (Option 1 and Option 2). In FIG. 25, for instance, "second and subsequent slots of transmission burst" represents subsequent slots (e.g., next slot of head slot and subsequent slots), and "slots other than left" represents the head slot. "slots other than left" also includes, for instance, slots in an untransmitted section of data before the head slot.

In the example illustrated in FIG. 25, Option 1 uses different methods to define monitoringSymbolsWithinSlot as "1000000000000" for the subsequent slots, and define monitoringSymbolsWithinSlot as "10101010101010" for the head slot. In other words, Option 1 sets, for instance, details included in monitoringSymbolsWithinSlot to be different between "second and subsequent slots of transmission burst" and "slots other than left".

This example indicates that the subsequent slot includes a search space at the head symbol (first symbol). Thus, the terminal 200 may search, for the subsequent slot, the head symbol in that slot.

Furthermore, the head slot indicates that monitoring is performed seven times every other symbol for, for instance, the head symbol (Symbol #0), the third symbol (Symbol #2), and the fifth symbol (Symbol #4). Thus, the terminal 200 may perform monitoring seven times at specified symbols for the head slot.

In the case of Option 1, the RRC message includes two definitions as illustrated in FIG. 25 for monitoringSymbolsWithinSlot, for instance, and the terminal 200 can execute such processing by receiving the RRC message.

Meanwhile, in the example illustrated in FIG. 25, Option 2 defines monitoringSymbolsWithinSlot as "10000000000000" for both of the subsequent slots and the head slot. In this case, the terminal 200 interprets a parameter indicated by monitoringSymbolsWithinSlot as a position relative to an actual transmission start symbol of each transmission opportunity. For instance, in the example of FIG. 24B, transmission is actually started from the fifth symbol in the head slot, and thus the terminal 200 interprets the fifth symbol as the first symbol with "1" in "10000000000000".

Like the case of Option 1, Option 2 of FIG. 25 specifies that monitoringSymbolsWithinSlot is included in the RRC message, and thus the terminal 200 can execute such processing by receiving the RRC message.

In Option 2, "Symbol#0, #2, #4, #6, #8, #10, #12" may be set as a transmission start pattern by an RRC message.

FIG. 26 depicts a diagram illustrating an example of the RRC message including a transmission start pattern. The example illustrated in FIG. 26 is an example in which IE of "PDCCH transmission ready timing" is included in PDSCH-Config. A parameter is set to be, for instance, "10101010101010" in "PDCCH transmission ready timing", so that "Symbol#0, #2, #4, #6, #8, #10, #12" of the head slot becomes a transmission opportunity, and the terminal 200 may monitor PDCCH at this timing.

"PDCCH transmission ready timing" may be included in PDCCH-Config or may be included in, for instance, other Config. It suffices that "PDCCH transmission ready timing" is included in, for instance, an RRCReconfiguration message.

Regarding Option 1 and Option 2, for instance, the control unit 122 of the base station 100 may generate an RRC message including monitoringSymbolsWithinSlot, and transmit the RRC message to the terminal 200 via the PDSCH generation unit 124.

FIG. 27A and FIG. 27B depict diagrams illustrating an example of monitoring by terminal 200 when Option 1 and Option 2 illustrated in FIG. 25 are set.

As illustrated in FIG. 27A, the terminal 200 monitors the untransmitted section from the head symbol in a slot every other symbol according to monitoringSymbolsWithinSlot in Option 1, or according to an RRC message in Option 2.

Then, the terminal 200 performs monitoring at the head symbol of the head slot of the transmission burst, and receives PDCCH and then PDSCH.

In the case of Option 1, the terminal 200 can receive PDCCH according to monitoringSymbolsWithinSlot (="10101010101010") to monitor the head slot.

In the case of Option 2, the terminal 200 can receive PDCCH according to "transmission start timing" of an RRC message to monitor the head symbol. In this case, the terminal 200 interprets "1" of "10000000000000" in monitoringSymbolsWithinSlot as the head symbol serving as the transmission start symbol.

The terminal 200 may set the second and subsequent slots of the transmission burst as the subsequent slots to monitor the head slot in that slot for both of Option 1 and Option 2.

Meanwhile, in the example of FIG. 27B, PDCCH and PDSCH start to be received from the fifth symbol in the head slot of the transmission burst. In Option 1, the terminal 200 receives PDCCH from the fifth symbol by using monitoringSymbolsWithinSlot to perform monitoring from the heard symbol every other symbol. In Option 2, the terminal 200 receives PDCCH from the fifth symbol by using "transmission start timing" of an RRC message to perform monitoring from the head symbol every other symbol. At this time, the terminal 200 interprets "1" of "10000000000000" of monitoringSymbolsWithinSlot as the fifth symbol (symbol 4).

Other Embodiments

Figure 28A:
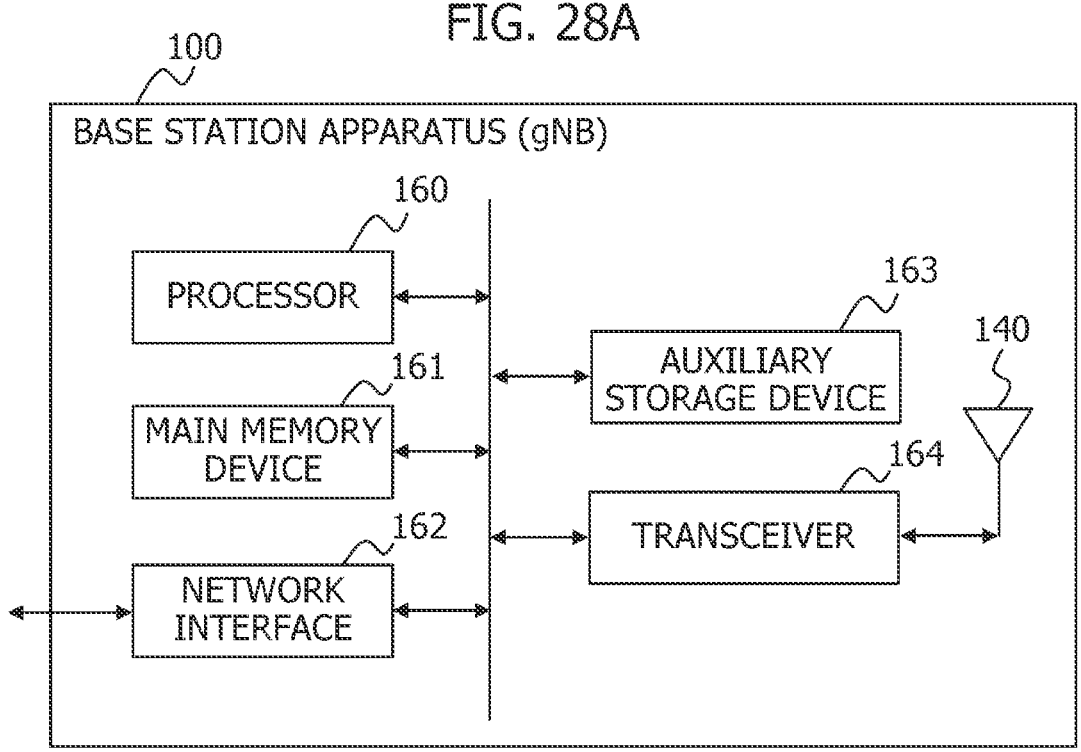
FIG. 28A depicts a diagram illustrating an example of the base station and FIG. 28B depicts a diagram illustrating an exemplary hardware configuration of the terminal, respectively.

FIG. 28A depicts a diagram illustrating an exemplary hardware configuration of the base station 100.

The base station 100 includes a processor 160, a main memory device 161, a network interface 162, an auxiliary storage device 163, a transceiver 164, and an antenna 140.

The processor 160 implements the function of the baseband signal processing unit 120 by reading a program stored in the main memory device 161, loading the program into the auxiliary storage device 163, and executing the loaded program. The processor 160 corresponds to the baseband signal processing unit 120 in the first embodiment, for instance.

Furthermore, the network interface 162 corresponds to the transmission line interface 110 in the first embodiment, for instance. The transceiver 164 corresponds to the RF transmission/reception unit 130 in the first embodiment, for instance.

Figure 28B:
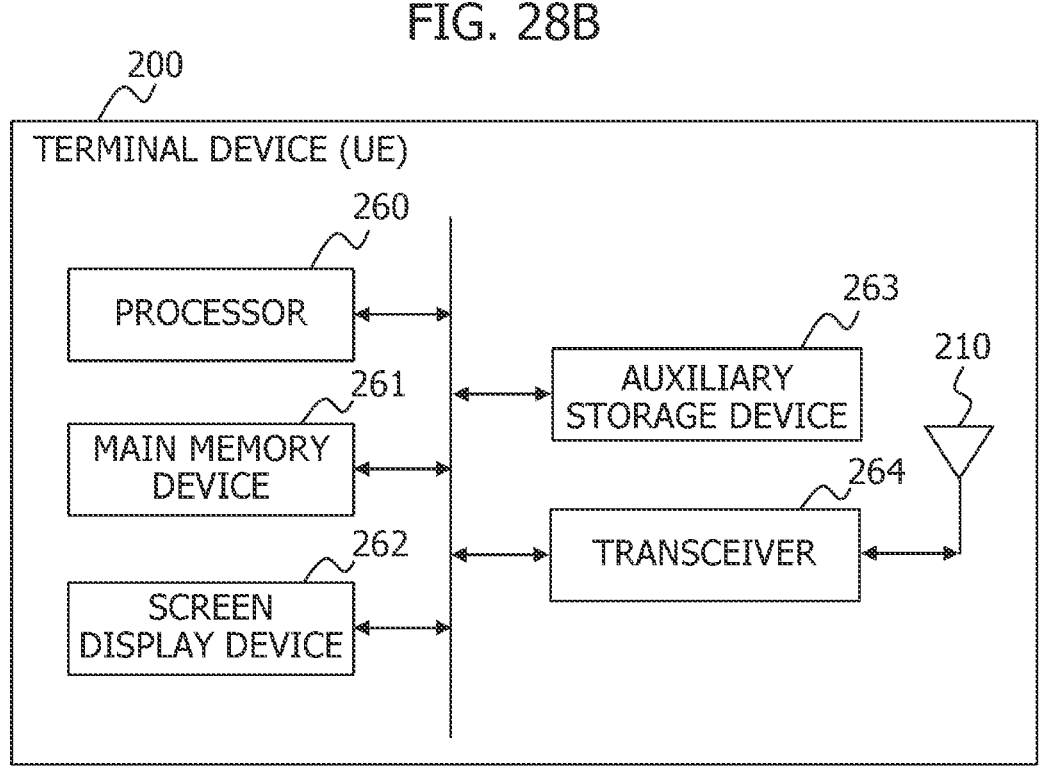

FIG. 28B depicts a diagram illustrating an exemplary hardware configuration of the terminal 200.

The terminal 200 includes a processor 260, a main memory device 261, an image display device 262, an auxiliary storage device 263, a transceiver 264, and an antenna 210.

The processor 260 implements the functions of the baseband signal processing unit 230 and the application unit 240 by reading a program stored in the main memory device 261, loading the program into the auxiliary storage device 263, and executing the loaded program. The processor 260 corresponds to the baseball signal processing unit 230 and the application unit 240 in the first embodiment, for instance.

Furthermore, the transceiver 264 corresponds to the RF transmission/reception unit 220 in the first embodiment, for instance.

The image display device 262 is controlled by the processor 260 to execute an application and display an image, for instance.

The processors 160 and 260 may be, for instance, a central processing unit (CPU), a micro processing unit (MPU), a field-programmable gate array (FPGA), or a digital processing unit (DSP).

Furthermore, in the first embodiment, description has been given of an example in which the base station 100 or the terminal 200 executes carrier sense in units of 2 symbols, for instance, and there are a total of 7 transmission opportunities in one slot. For instance, when the base station 100 or the terminal 200 executes carrier sense in units of one symbol, there are a total of 14 transmission opportunities in one slot. Furthermore, with regard to the base station 100 or the terminal 200, description has been given of an example in which shifting is performed in units of symbol period, for instance. For instance, the base station 100 or the terminal 200 may shift the head symbol in units of period (or units of time) shorter than the symbol period. Alternatively, the unit for shifting may be an integer multiple, and the transmission start timing may be the middle of the symbol period. In this case, when the control unit 122 of the base station 100 or the control unit 234 of the terminal 200 copies data or a signal included in the head symbol and shifts the head symbol, for instance, the control unit 122 or the control unit 234 adds the coped data or signal to the head symbol in the forward direction with respect to time, to thereby enable transmission from the middle of the symbol period. When the head symbol of a slot is set not to include a search space in downlink transmission from the base station 100, or when the terminal 200 executes uplink transmission, transmission may be started from the middle of the head symbol in synchronization with the transmission start timing.

Furthermore, in the first embodiment, description has been given of an example of transmitting all the data, DCI, RRC message, and HARQ-ACK by using a predetermined frequency band of Unlicensed frequency band. As the wireless system 10, both of Licensed frequency band and frequency band may be used for transmission, and a part or all of DCI, an RRC message, and HARQ-ACK, which relate to data transfer in Unlicensed frequency band, may be transmitted by using Licensed frequency band.

It is possible to improve throughput.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10: WIRELESS COMMUNICATION SYSTEM
100: BASE STATION APPARATUS (BASE STATION)
110: TRANSMISSION LINE INTERFACE
120: BASEBALL SIGNAL PROCESSING UNIT
121: RECEIVED SIGNAL PROCESSING UNIT
122: CONTROL UNIT
123: PDCCH GENERATION UNIT
124: PDSCH GENERATION UNIT
125: MAPPING UNIT
130: RE TRANSMISSION/RECEPTION UNIT
140: ANTENNA

160: PROCESSOR
200 (200-1,200-2): TERMINAL DEVICE (TERMINAL)
210: ANTENNA
220: RF TRANSMISSION/RECEPTION UNIT
230: BASEBAND SIGNAL PROCESSING UNIT
231: PDCCH RECEPTION PROCESSING UNIT
232: PDSCH RECEPTION PROCESSING UNIT
234: CONTROL UNIT
235: PUSCH GENERATION UNIT
236: PUCCH GENERATION UNIT
237: MAPPING UNIT
240: APPLICATION UNIT
260: PROCESSOR

What is claimed is:

1. A reception device, which is capable of wirelessly communicating with a transmission device by using a first frequency band that does not need a license, the reception device comprising:
a receiver configured to receive a first information element and a second information element, wherein each of the first information element and the second information element contains information on the symbols at which the transmission device may transmit a first control signal,
processor circuitry configured to:
monitor the first control signal according to the first information element until detecting the first control signal; and
if the first control signal is detected according to the first information element,
stop monitoring the first control signal according to the first information element, and
start monitoring another first control signal according to the second information element.

2. The reception device according to claim 1, wherein the first control signal is PDCCH (Physical Downlink Control Channel) which carries DCI (Downlink Control Information).

3. The reception device according to claim 1, wherein the processor circuitry is configured to start monitoring the another first control signal according to the second information element in a first slot after a slot in which the first control signal is detected.

4. A wireless communication system comprising:
a transmission device; and
a reception device,
with the transmission device and the reception device being capable of wirelessly communicating with each other by using a first frequency band that does not need a license, wherein
the transmission device is configured to transmit, to the reception device, a first information element and a second information element, wherein each of the first information element and the second information element contains information on the symbols at which the transmission device is configured to transmit a first control signal; and
the reception device is configured to:
monitor the first control signal according to the first information element until detecting the first control signal; and
if the first control signal is detected according to the first information element,
stop monitoring the first control signal according to the first information element, and
start monitoring another first control signal according to the second information element.

5. A method for a reception device and which is capable of wirelessly communicating with a transmission device by using a first frequency band that does not need a license, the communication method comprising:
receiving a first information element and a second information element, wherein each of the first information element and the second information element contains information on the symbols at which the transmission device may transmit a first control signal,
monitoring the first control signal according to the first information element until detecting the first control signal; and
if the first control signal is detected according to the first information element,
stopping monitoring the first control signal according to the first information element, and
starting monitoring another first control signal according to the second information element.

6. A transmission device, which is capable of wirelessly communicating with a reception device by using a first frequency band that does not need a license, the transmission device comprising:
a memory that stores a plurality of instructions;
processor circuitry that couples to the memory and that is configured to transmit, to the reception device from the transmission device, a first information element and a second information element, wherein each of the first information element and the second information element contains information on the symbols at which the transmission device is configured to transmit a first control signal,
wherein the reception device is configured to:
monitor the first control signal according to the first information element until detecting the first control signal; and
if the first control signal is detected according to the first information element,
stop monitoring the first control signal according to the first information element, and
start monitoring another first control signal according to the second information element.

* * * * *